(12) United States Patent
Bercovich et al.

(10) Patent No.: US 9,008,220 B2
(45) Date of Patent: Apr. 14, 2015

(54) FREQUENCY REUSE IN WIRELESS POINT-TO-POINT COMMUNICATION SYSTEMS

(75) Inventors: Dudu Bercovich, Kfar-Saba (IL); Sharon Heruti, Tel-Aviv (IL); Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 26 days.

(21) Appl. No.: 12/961,540

(22) Filed: Dec. 7, 2010

(65) Prior Publication Data

US 2012/0140849 A1    Jun. 7, 2012

(51) Int. Cl.
*H04K 1/02* (2006.01)
*H04L 25/03* (2006.01)
*H04L 25/49* (2006.01)
*H04L 25/02* (2006.01)

(52) U.S. Cl.
CPC ...... *H04L 25/0204* (2013.01); *H04L 25/03343* (2013.01); *H04L 2025/03426* (2013.01)

(58) Field of Classification Search
None
See application file for complete search history.

(56) References Cited

U.S. PATENT DOCUMENTS

| | | | | |
|---|---|---|---|---|
| 7,133,642 | B2* | 11/2006 | Uesugi | 455/63.1 |
| 2005/0262402 | A1* | 11/2005 | Ballester et al. | 714/704 |
| 2006/0050811 | A1* | 3/2006 | Abe et al. | 375/299 |
| 2006/0121946 | A1 | 6/2006 | Walton et al. | |
| 2006/0203820 | A1* | 9/2006 | Coluccio | 370/392 |
| 2007/0014334 | A1* | 1/2007 | Currivan et al. | 375/148 |
| 2008/0096566 | A1* | 4/2008 | Brunner et al. | 455/437 |
| 2010/0232536 | A1 | 9/2010 | Park et al. | |
| 2011/0021170 | A1* | 1/2011 | Kolze et al. | 455/296 |

FOREIGN PATENT DOCUMENTS

EP    2034682    3/2009

OTHER PUBLICATIONS

Communication Pursuant to Rules 70(2) and 70a(2) EPC and Reference to Rule 39(1) EPC Dated Jun. 18, 2012 From the European Patent Office Re. Application No. 10194038.5.
(Continued)

*Primary Examiner* — Shuwang Liu
*Assistant Examiner* — Gina McKie

(57) ABSTRACT

A method for interference reduction in transmission of at least two single carrier frequency continuous communication beams including producing a first communication signal for a first digital communication link, producing a second communication signal for a second digital communication link, transmitting the first communication signal over a first continuous communication beam at a first frequency, transmitting the second communication signal over a second continuous communication beam at the first frequency, characterized by modifying the first communication signal using transmitter interference cancellation.

A method for interference reduction in reception of at least two single carrier frequency continuous communication beams including receiving a first received signal from a first digital communication link, receiving a second received signal from a second digital communication link, modifying the first received signal, adding the modified first received signal to the second received signal, thereby producing a reduced-interference second received signal, characterized by the modifying of the first received signal being based, at least in part, on reducing an error rate of the reduced-interference second received signal.

Related apparatus and methods are also described.

17 Claims, 13 Drawing Sheets

(56) References Cited

OTHER PUBLICATIONS

European Search Report Dated Oct. 2, 2011 From the European Patent Office Re. Application No. 10194038.5.
Lu et al. "A Data-Aided Channel Estimation Method Based on CAZAC", IEEE 68th Vehicular Technology Conference, p. 1-5, 2008.
Rajeswari et al. "Channel Estimation From Known Preamble Sequences", The 8th International Conference on Communication Systems, ICCS 2002, 1: 270-273, 2002.
Rizaner et al. "Channel Estimation Using Short Training Sequences", IEEE 52nd Vehicular Technology Conference, 6:2630-2633, 2000.
Partial European Search Report Dated Jun. 7, 2011 From the European Patent Office Re. Application No. 10194038.5.
Samsung Downlink MIMO for EUTRA, 3GPP Draft, R1-0600335-PU2RC-EUTRA, 3rd Generation Partnership Project (3GPP), Meeting #44, Denver, USA, Feb. 13-17, 2006, XP050101282, RAN WG1, Feb. 9, 2006.
Office Action Dated Jun. 1, 2014 From the Israel Patent Office Re. Application No. 209831.
Communication Pursuant to Article 94(3) EPC Dated Mar. 1, 2013 From the European Patent Office Re. Application No. 10194038.5.
Communication Pursuant to Article 94(3) EPC Dated Jan. 28, 2014 From the European Patent Office Re. Application No. 10194038.5.

\* cited by examiner

FREQUENCY REUSE IN WIRELESS POINT-TO-POINT COMMUNICATION SYSTEMS

FIELD AND BACKGROUND OF THE INVENTION

The present invention, in some embodiments thereof, relates to a wireless point-to-point communication system, and, more particularly, but not exclusively, to a single-carrier modulation scheme with a continuous transmission.

Wireless point-to-point communication systems are deployed all over the world, for example as a backbone of cellular networks and wireless Internet services. The wireless point-to-point communication systems usually require a Line-Of-Sight (LOS) and use a regulated frequency band, in order to ensure high availability with little or no interference. A required bit-error-rate in such links is typically below $10^{-13}$. Frequency bands used in such regulated communication systems are commonly in the range of 7 GHz to 38 GHz.

Since communication happens between two specific nodes in a network, transmission beams are generated using dish antennas which focus the transmission beams, which provide a receiver with a stronger signal and less interference than unfocused transmissions. The focused beams cause interference with other wireless links which use the same frequency when the beams are also in a similar direction.

For purposes of better understanding some embodiments of the present invention, as illustrated in FIGS. 2A, 2B, 3, 4A, 4B, 5, 6, 7A, 7B, and 8 of the drawings, reference is first made to FIG. 1A, which is a simplified illustration of a tree network 100 scenario in which an aggregation point 110 communicates with two tail sites 115 116 via two communication links 113 114.

Such a scenario is termed a tree network, in which the tail sites 115 116 are tree "leaves". An angular separation 111 between the two tail sites 115 116 is too small for using the same frequency on the two communication links 113 114. When the same frequency is used, the interference between the two communication links 113 114 is in both directions, i.e., from the aggregation point 110 to the tail sites 115 116 and from the tail sites 115 116 to the aggregation point 110.

In such a case, different frequencies have to be used on the two communication links 113 114. Frequencies are usually regulated, and obtaining frequencies is very expensive. If no communication frequencies are available, wireless communication cannot be established, and expensive alternatives should be considered, such as, by way of a non-limiting example, laying a land line.

The example above describes an aggregation point 110 communicating with two tail sites 115 116. However, some applications may include network rings which do not necessarily involve an aggregation point.

Reference is now made to FIG. 1B, which is a simplified illustration of a ring network 120 scenario in which the ring network includes several nodes 125 126 127 128 129. The nodes 125 126 127 128 129 are connected by communication links 140 141 142 143 144.

Angular separations 130, 132, and 133 between the communication links 140 144, 141 142, and 142 143 respectively, are too small for using a same frequency on the pairs of communication links 140 144, 141 142, and 142 143 respectively.

Angular separations 131 and 134 between the communication links 140 141 and 143 144 respectively, are close to 180°. At such angles if a same frequency is used on the pairs of communication links, the pairs of communication links 140 141 and 143 144 may interfere. For example, node A 125 may receive both communications via the communication link 140 from node B 126 and interference from the communication link 141 from node C 127.

In such a case also, different frequencies have to be used on the interfering communication links.

It is noted that FIG. 1B depicts a ring with all communication links having potentially problematic angles. Many rings may have some communication links with problematic angles, and some without.

It is noted that both the ring network 120 and the tree network 100 with an aggregation point are common scenarios.

Additional background art includes:

Rizaner A., Amca H. A., Hacioglu K., Ulusoy A. H., "Channel Estimation using Short Training Sequences", IEEE 52nd Vehicular Technology Conference, 2000, Vol. 6, pp. 2630-2633.

Miao Lu, Bo Chen, Xiaolin Hou, Xin Zhang, Dongmei Luo, "A Data Aided Channel Estimation Method Based on CAZAC", IEEE 68th Vehicular Technology Conference, 2008, pp. 1-5.

Raja Rajeswari K., Gangatharan N., Morris G. E., Radhakrishna Rao G. S. V., Visvesvara Rao B., Swamy, G. N., "Channel Estimation from Known Preamble Sequences", The 8th International Conference on Communication Systems, 2002. ICCS 2002, Vol. 1, pp. 270-273

SUMMARY OF THE INVENTION

The present invention, in some embodiments thereof, includes a method for interference reduction in transmission of at least two single carrier continuous communication beams by using transmitter interference cancellation.

Interference between two communication beams from a single aggregation point is affected by the contents of the two communication beams. The contents of the two communication channels are known at the aggregation point. Therefore something is optionally done at the aggregation point about the interference, based on knowing the contents.

The term "aggregation point" in all its grammatical forms is used throughout the present specification and claims to mean a location from which two or more communication channels are transmitted.

When the interference is substantially decreased, the communication links which according to prior art had to use different frequencies, may use the same frequency. Using the same frequency, also termed frequency re-use, may save significant expense if the alternative was buying an additional frequency, or significant expense and effort, if laying a land line was the alternative.

In describing the present invention, the tree-network-with-an-aggregation-point scenario, described in the Background section, will be used to demonstrate various features, for purpose of simplifying the description. The invention applies to the ring network scenario as well, and to other scenarios in which a node receives and transmits in directions which have a small angular separation.

What actual angle may be considered to form a small angular separation may depend on desired Signal to Noise Ratio (SNR) at a receiver, and/or on a desired Bit Error Rate (BER). By way of a non-limiting example, a 16-QAM modulation with an example coding may provide an acceptable BER of $10^{-12}$ at an SNR of 20 dB. If interference is to degrade performance by no more than 0.5 dB, the interference should be at least 10 dB below thermal noise, about 30 dB below a required signal level.

A desired angular separation (for the above-mentioned 30 dB isolation) depends on an antenna size and carrier frequency, as shown in the following example table. The angular separation in the example ranges between 5 degrees and 17.5 degrees.

TABLE 1

| | Carrier frequency | | | | |
|---|---|---|---|---|---|
| Antenna diameter | 15 GHz | 18 GHz | 23 GHz | 28 GHz | 38 GHz |
| 1 [Ft] | 17.5 | 15.0 | 12.0 | 9.0 | |
| 2 [ft] | 9.0 | 9.0 | 10.0 | 4.5 | 5.0 |

In case of larger constellations, which require better SNR, the required angular separation may reach angles of 60 degrees and more. Sometimes no separation is good enough. In such a case, embodiments of the invention are especially useful, enabling a cancelling of interference at a transmitting end, thereby enabling frequency reuse.

The present invention, in some embodiments thereof, presents a practical method for sharing, or reusing, the same frequency in two previously interfering communication channels, by substantially reducing the interference. In a previously problematic example such as described above with reference to FIG. 1A, the aggregation point can transmit to the two tail sites in the same frequency and receive signals from both tail sites in the same frequency.

According to an aspect of some embodiments of the present invention there is provided a method for interference reduction in transmission of at least two single carrier frequency continuous communication beams including producing a first communication signal for a first digital communication link, producing a second communication signal for a second digital communication link, transmitting the first communication signal over a first continuous communication beam at a first frequency, transmitting the second communication signal over a second continuous communication beam at the first frequency, characterized by modifying the first communication signal using transmitter interference cancellation.

According to some embodiments of the invention, further including modifying the second communication signal using transmitter interference cancellation.

According to some embodiments of the invention, further including passing at least one of the first communication signal and the second communication signal through a channel emulator, producing output of at least one of the first communication signal and the second communication signal as modified by the channel emulator, measuring an error rate of at least one of the outputs of the channel emulator, and performing the modifying based, at least in part, on the error rate.

According to some embodiments of the invention, further including a first receiver receiving the first communication signal over the first continuous communication beam measuring an error rate, the first receiver sending the error rate to a unit configured for the modifying the first communication signal, performing the modifying based, at least in part, on the error rate.

According to some embodiments of the invention, further including optimizing coefficients for use in a filter used for the modifying.

According to some embodiments of the invention, the modifying is performed, at least in part, by passing the first communication signal through a pre-coding filter, and in which coefficients for the pre-coding filters are calculated as follows:

a sample set of N impulse response samples, $h_{11}(n)$, $h_{12}(n)$, $h_{21}(n)$, and $h_{22}(n)$ where $0 \leq n \leq N-1$, is selected, a discrete Fourier transform of the sample set is evaluated, producing corresponding Fourier coefficients $H_{11}(k)$, $H_{12}(k)$, $H_{21}(k)$, and $H_{22}(k)$ where $0 \leq k \leq N-1$, for each value of k a matrix $$M_k = \begin{pmatrix} H_{11}[k] & H_{12}[k] \\ H_{21}[k] & H_{22}[k] \end{pmatrix}$$

is defined, for each matrix $M_k$ a matrix $$P_k = \begin{pmatrix} P_{11}[k] & P_{12}[k] \\ P_{21}[k] & P_{22}[k] \end{pmatrix} = M_k^{-1} \cdot \begin{pmatrix} H_{11}[k] & 0 \\ 0 & H_{22}[k] \end{pmatrix}$$

is evaluated, for each value of k a window-coefficient W[k] is defined, for each value of k the coefficients $P_{11}[k]$, $P_{12}[k]$, $P_{21}[k]$, and $P_{22}[k]$ are multiplied by a corresponding window coefficient W[k], producing a set of modified coefficients $\tilde{P}_{11}[k]$, $\tilde{P}_{12}[k]$, $\tilde{P}_{21}[k]$ and $\tilde{P}_{22}[k]$, and an inverse Fourier transform of the vectors $\tilde{P}_{11}[k]$, $\tilde{P}_{12}[k]$, $\tilde{P}_{21}[k]$ and $\tilde{P}_{22}[k]$ is evaluated, producing sets of time domain coefficients $p_{11}[n]$, $p_{12}[n]$, $p_{21}[n]$, and $p_{22}[n]$, thereby producing time domain coefficients for the pre-coding filters.

According to some embodiments of the invention, the modifying is performed by phase shifting.

According to some embodiments of the invention, the phase shifting is such that the first communication signal, transmitted over the first continuous communication beam, is substantially attenuated with respect to the second communication signal, transmitted over the second continuous communication beam.

According to some embodiments of the invention, an angle between the first continuous communication beam and the second continuous communication beam is substantially acute. According to some embodiments of the invention, the angle is smaller than 9°.

According to some embodiments of the invention, an angle between the first continuous communication beam and the second continuous communication beam is substantially obtuse. According to some embodiments of the invention, the angle is between 171° and 189°.

According to an aspect of some embodiments of the present invention there is provided apparatus for interference reduction in transmission of at least two single carrier frequency continuous communication beams including a pre-coder unit configured to receive a first communication signal for a first digital communication link, to receive a second communication signal for a second digital communication link, and to modify the first communication signal using a transmitter interference cancellation method based, at least in part, on the second communication signal.

According to some embodiments of the invention, further including a signal adder for adding a signal based, at least in part, on the first communication signal, and a signal based, at least in part, on the second communication signal.

According to some embodiments of the invention, further including one or more channel emulators, configured to receive input of the first communication signal and the second communication signal and produce output of at least the first communication signal as modified by the channel emulator, an error detector configured to input the output of the one or more channel emulators, and produce output based, at least in part, on an error rate of at least one of the inputs, and a feedback channel from the error detector to the pre-coder unit.

According to some embodiments of the invention, further including one or more phase shifters, configured to modify the first communication signal by phase shifting.

According to an aspect of some embodiments of the present invention there is provided a method for interference reduction in reception of at least two single carrier frequency continuous communication beams including receiving a first received signal from a first digital communication link, receiving a second received signal from a second digital communication link, modifying the first received signal, adding the modified first received signal to the second received signal, thereby producing a reduced-interference second received signal, characterized by the modifying of the first received signal being based, at least in part, on reducing an error rate of the reduced-interference second received signal.

According to some embodiments of the invention, the modifying includes phase shifting.

According to some embodiments of the invention, the modifying includes modifying with a Finite Impulse Response (FIR) filter.

According to some embodiments of the invention, further including modifying the second received signal, adding the modified second received signal to the first received signal, thereby producing a reduced-interference first received signal, in which the modifying of the second received signal is based, at least in part, on reducing an error rate of the reduced-interference first received signal.

According to some embodiments of the invention, further including interference reduction in transmission of at least two single carrier frequency continuous communication beams by producing a first transmission signal intended for a first digital communication link, producing a second transmission signal intended for a second digital communication link, modifying the first transmission signal, adding the modified first transmission signal to the second transmission signal, thereby producing a reduced-interference second transmission signal, in which the modifying of the first transmission signal is based, at least in part, parameters discovered while reducing the error rate of the reduced-interference second received signal.

According to some embodiments of the invention, further including modifying the second transmission signal, adding the modified second transmission signal to the first transmission signal, thereby producing a reduced-interference first transmission signal, in which the modifying of the second transmission signal is based, at least in part, on reducing an error rate of the reduced-interference first transmission signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
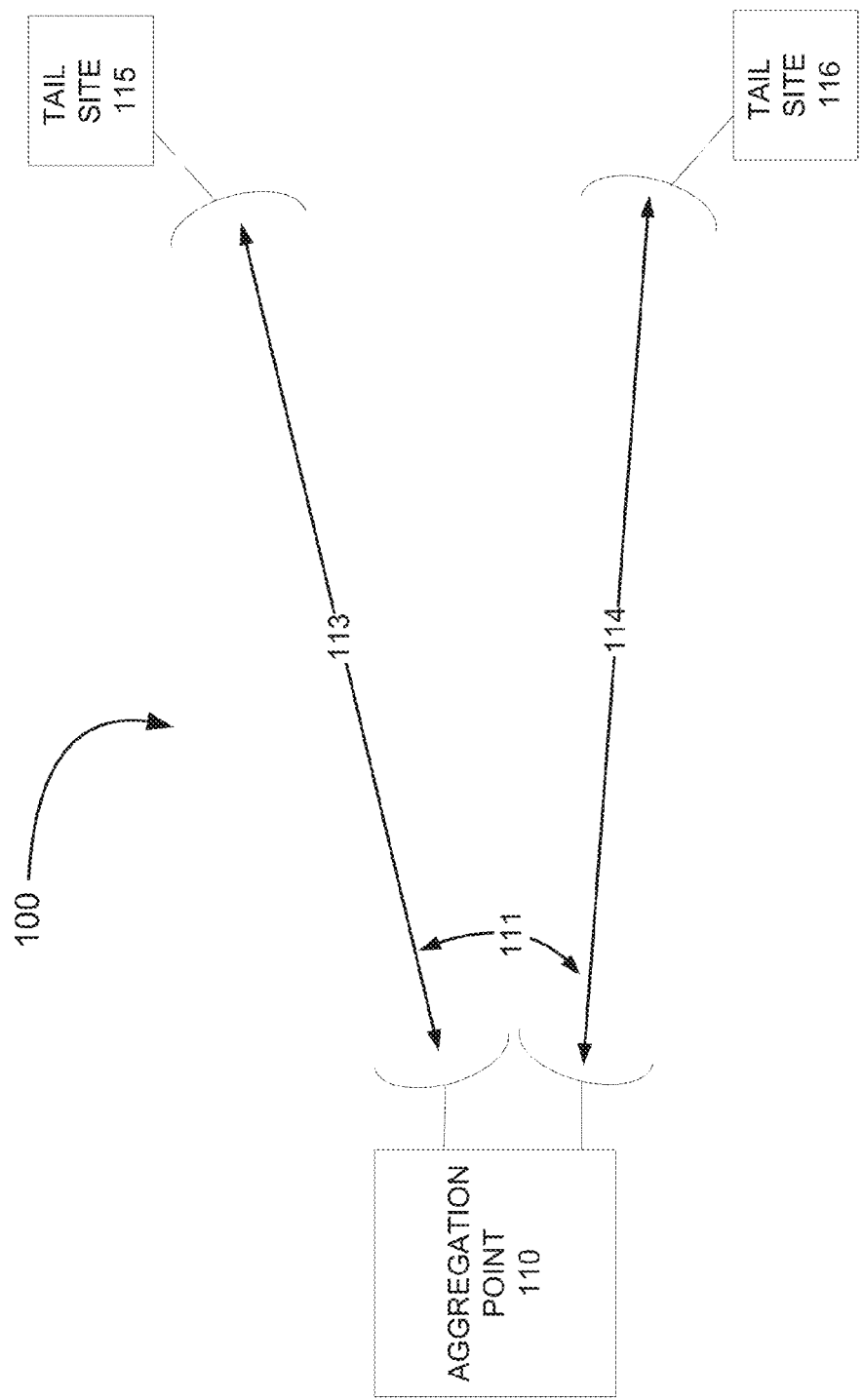
FIG. 1A is a simplified illustration of a tree network scenario in which an aggregation point communicates with two tail sites via two communication links.
Figure 1B:
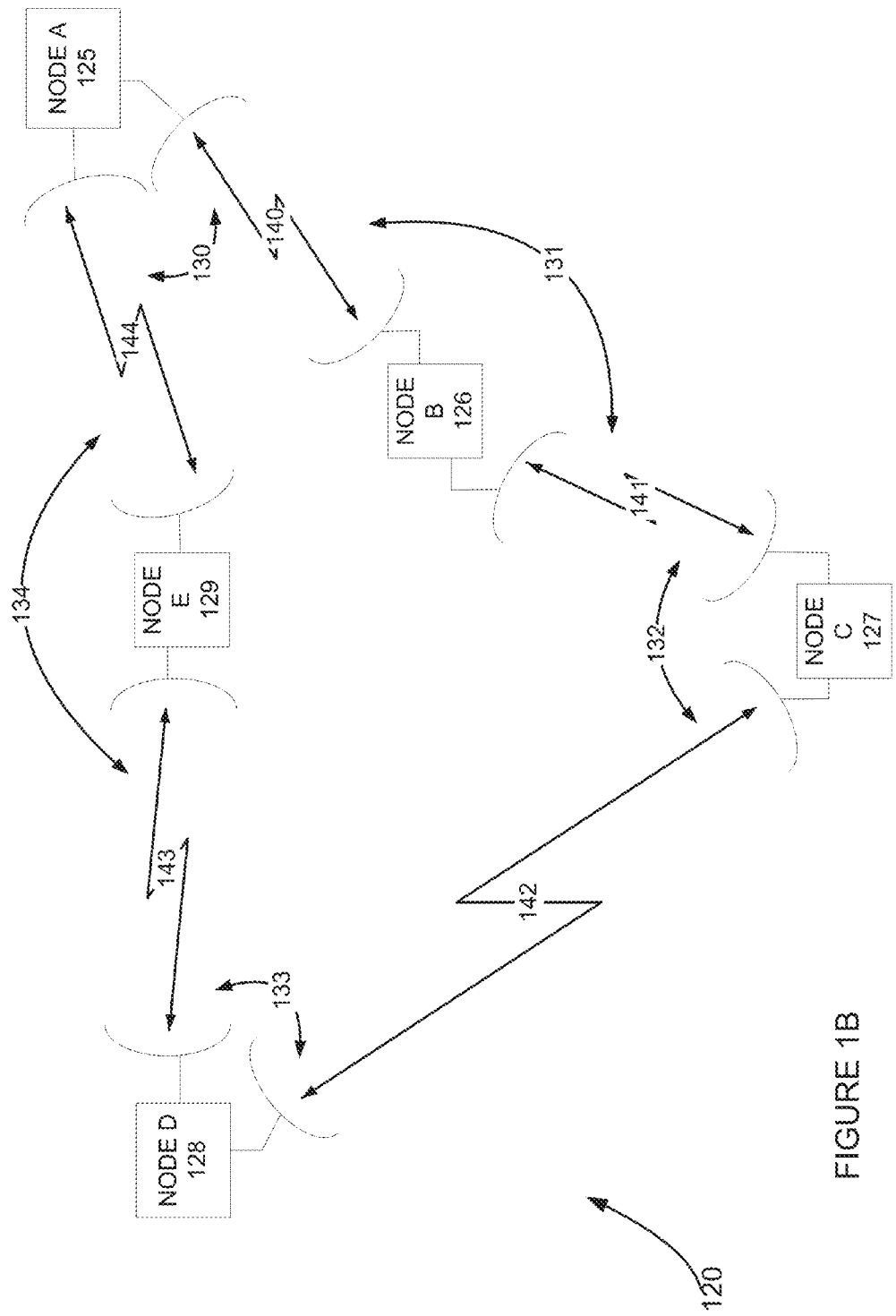
FIG. 1B is a simplified illustration of a ring network scenario in which the ring network includes several nodes.

The present invention, in some embodiments thereof, relates to a wireless point-to-point communication system, and, more particularly, but not exclusively, to a single-carrier modulation scheme with a continuous transmission.

In describing the present invention, the tree-network-with-an-aggregation-point scenario, described in the Background section, will be used to demonstrate various features, for purpose of simplifying the description. The invention applies to the ring network scenario as well, and to other scenarios in which a node receives and transmits in directions which have a small angular separation.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

The present invention, in some embodiments thereof, describes a single-carrier modulation scheme with a continuous transmission. The communication channels are assumed to be dispersive and time-varying. Such conditions are common in such wireless networks.

In some embodiments of the present invention, a unit within an aggregation point substantially decreases and/or cancels mutual interference in both directions from the aggregation point. The unit can optionally do so, since traffic in both directions passes through the unit.

Figure 2A:
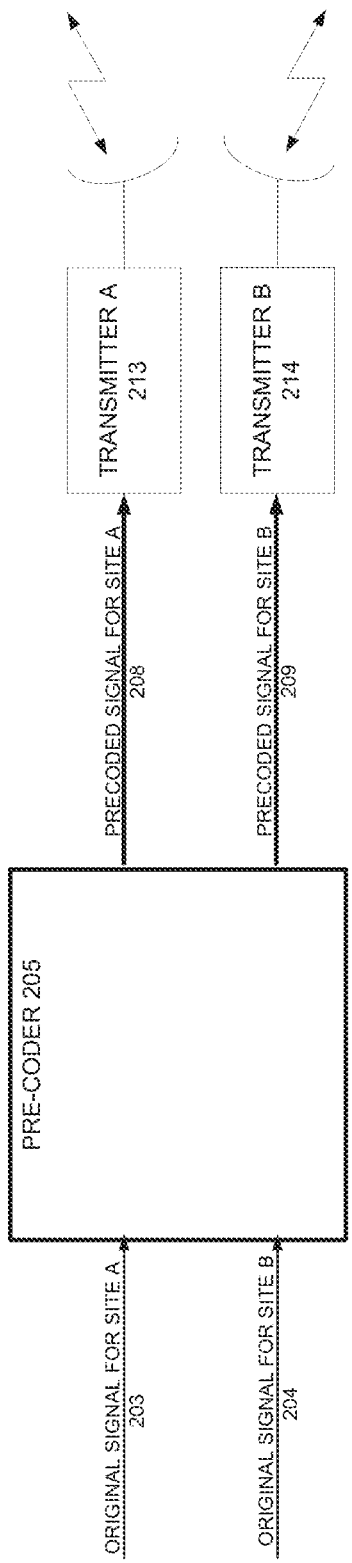
FIG. 2A is a simplified block diagram illustration of units in an aggregation point, constructed and operative according to an example embodiment of the present invention.

In some embodiments of the invention, a pre-coder for cancelling interference between the tail sites is implemented in the aggregation site, as illustrated in FIG. 2A.

Reference is now made to FIG. 2A, which is a simplified block diagram illustration of units in an aggregation point, constructed and operative according to an example embodiment of the present invention.

An input signal for site A 203 and an input signal for site B 204 are fed into a pre-coder 205. The pre-coder 205 outputs a pre-coded signal for site A 208 and a pre-coded signal for site B 209. The pre-coded signal for site A 208 and the pre-coded signal for site B 209 are each fed into transmitter A 213 and transmitter B 214 respectively, and transmitted to site A and site B respectively.

Figure 2B:
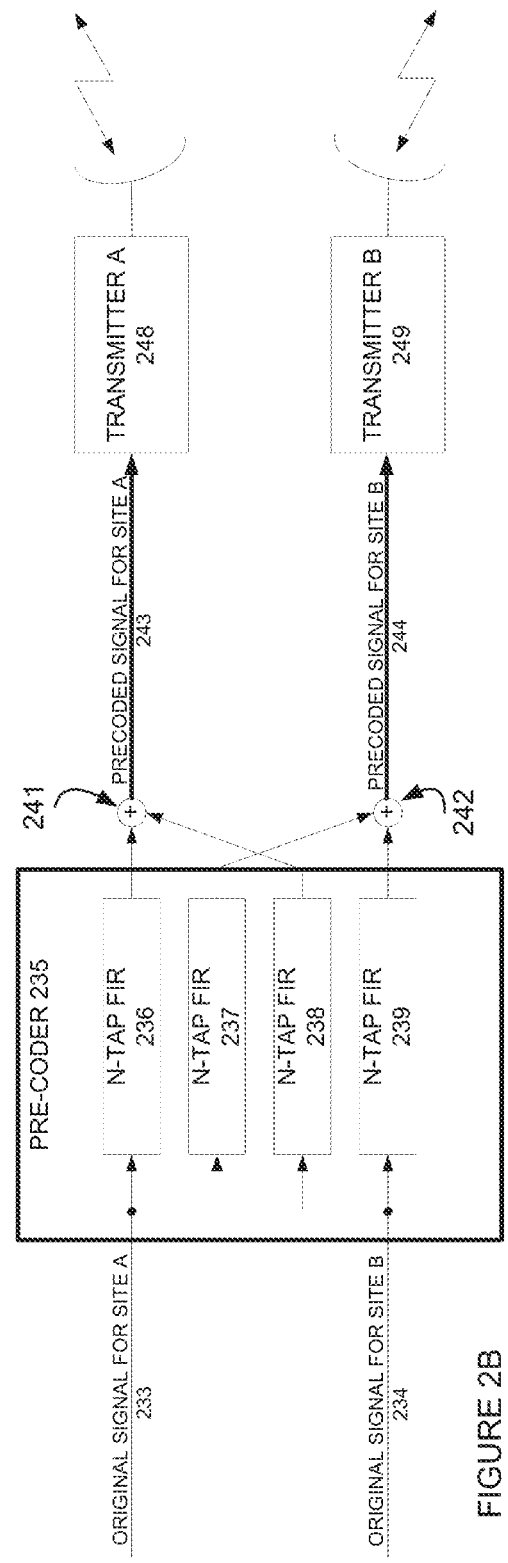
FIG. 2B is a more detailed simplified block diagram illustration of units in an aggregation point, constructed and operative according to an example embodiment of the present invention.

Reference is now made to FIG. 2B, which is a more detailed simplified block diagram illustration of units in an aggregation point, constructed and operative according to an example embodiment of the present invention.

The aggregation point includes a pre-coder 235 and two transmitters 248 249.

The pre-coder 235 is composed of 4 filters 236 237 238 239 which are configured in such a way which cancels the interference in the tail sites. By way of a non-limiting example, the filters 236 237 238 239 are digital Finite Impulse Response (FIR) filters.

An input signal for site A 233 and an input signal for site B 234 are fed into the pre-coder 235. The input signal for site A 233 is split in two, and fed into two of the filters 236 237 and the input signal for site B 234 is split in two, and fed into two of the filters 238 239. Output from two of the filters 236 238 is provided to a signal adder 241, and output from two of the filters 237 239 is provided to a signal adder 242. The adders 241 242 each produce a pre-coded signal for site A 243 and a pre-coded signal for site B 244. The pre-coded signal for site A 243 and the pre-coded signal for site B 244 are each fed into transmitter A 248 and transmitter B 249 respectively, and transmitted to site A and site B respectively.

Intuitively speaking, the output of the site A filter 237 which is added to the signal coming from the site B filter 239 is intended to cancel, as much as possible, the interference which the communication beam to site A causes to the communication beam to site B. Symmetrically, the output of the site B filter 238 which is added to the signal coming from the site A filter 236 is intended to cancel, as much as possible, the interference which the communication beam to site B causes to the communication beam to site A.

The digital FIR filters 236 237 238 239 require a method for estimating digital coefficients. For this task two functions are used: a function which estimates the channel frequency response from each transmitting antenna to each receiving antenna; and a function which converts the estimates into pre-coder coefficients.

Channel estimation may be based on transmitting a sequence known at both ends of the communication links. A receiver may estimate the channel by standard techniques such as, by way of a non-limiting example, techniques proposed in the references mentioned in the Background section.

It is now noted that examples brought in the present application include cases with two transmission directions, to a site A and a site B. The descriptions of the examples are extendable to more than two transmission directions, by a person skilled in the art. Suffice it to say that more than four 236 237 238 239 filters would be used in the pre-coder 235; more than two transmitters 248 249 would be used; more than two adders 241 242 would accept signals from the more than the four filters 236 237 238 239, optionally accepting signals from each one of the transmission directions.

Figure 3:
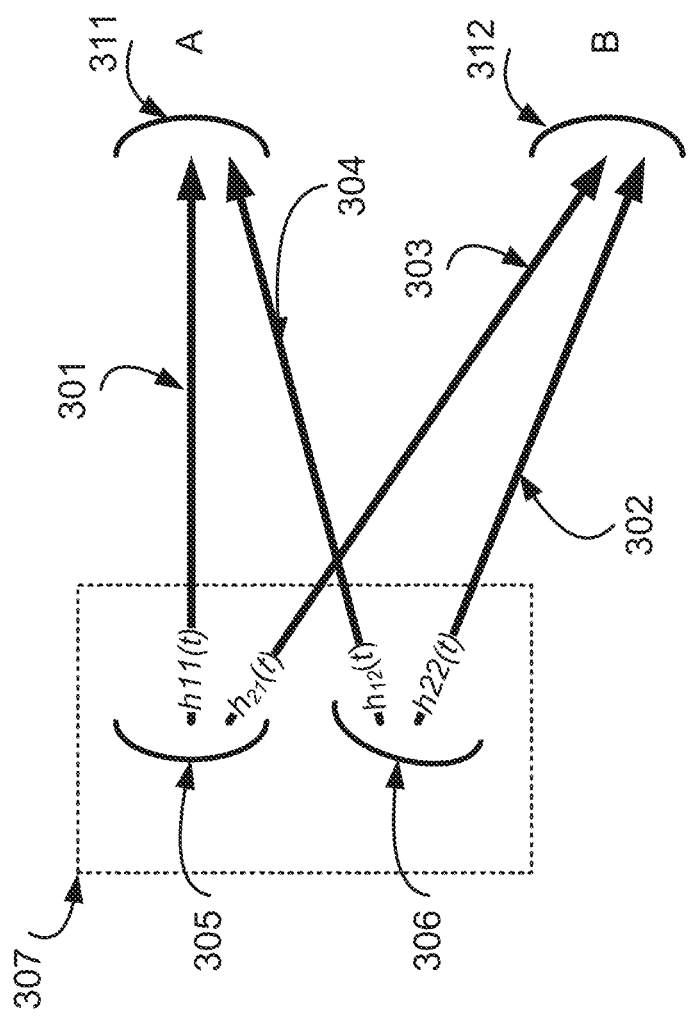
FIG. 3 is a simplified illustration of four communication channels which are to be estimated.

Reference is now made to FIG. 3, which is a simplified illustration of four communication channels 300 301 302 303 which are to be estimated.

FIG. 3 depicts an antenna 305 for transmitting from an aggregation point 307 via the communication channel 301 to an antenna 311 at node A; an antenna 306 for transmitting from the aggregation point 307 via the communication channel 302 to an antenna 312 at node B; the communication channel 303, which stands for interfering transmissions from the antenna 305 to the antenna 312 at node B; and the communication channel 304, which stands for interfering transmissions from the antenna 306 to the antenna 311 at node B.

Impulse responses of the four channels are denoted in the time domain by $h_{11}(t)$, $h_{12}(t)$, $h_{21}(t)$, and $h_{22}(t)$ respectively.

In some embodiments of the invention each estimated channel impulse response is presented by 1 sample per symbol, 2 samples per symbol, or any other number of samples per symbol.

In some embodiments of the invention the number of samples per symbol in the pre-coder filters equals the number of samples per symbol in the channel estimator. This is for convenience, since the pre-coder coefficients are derived from the channel impulse responses.

Figure 4A:
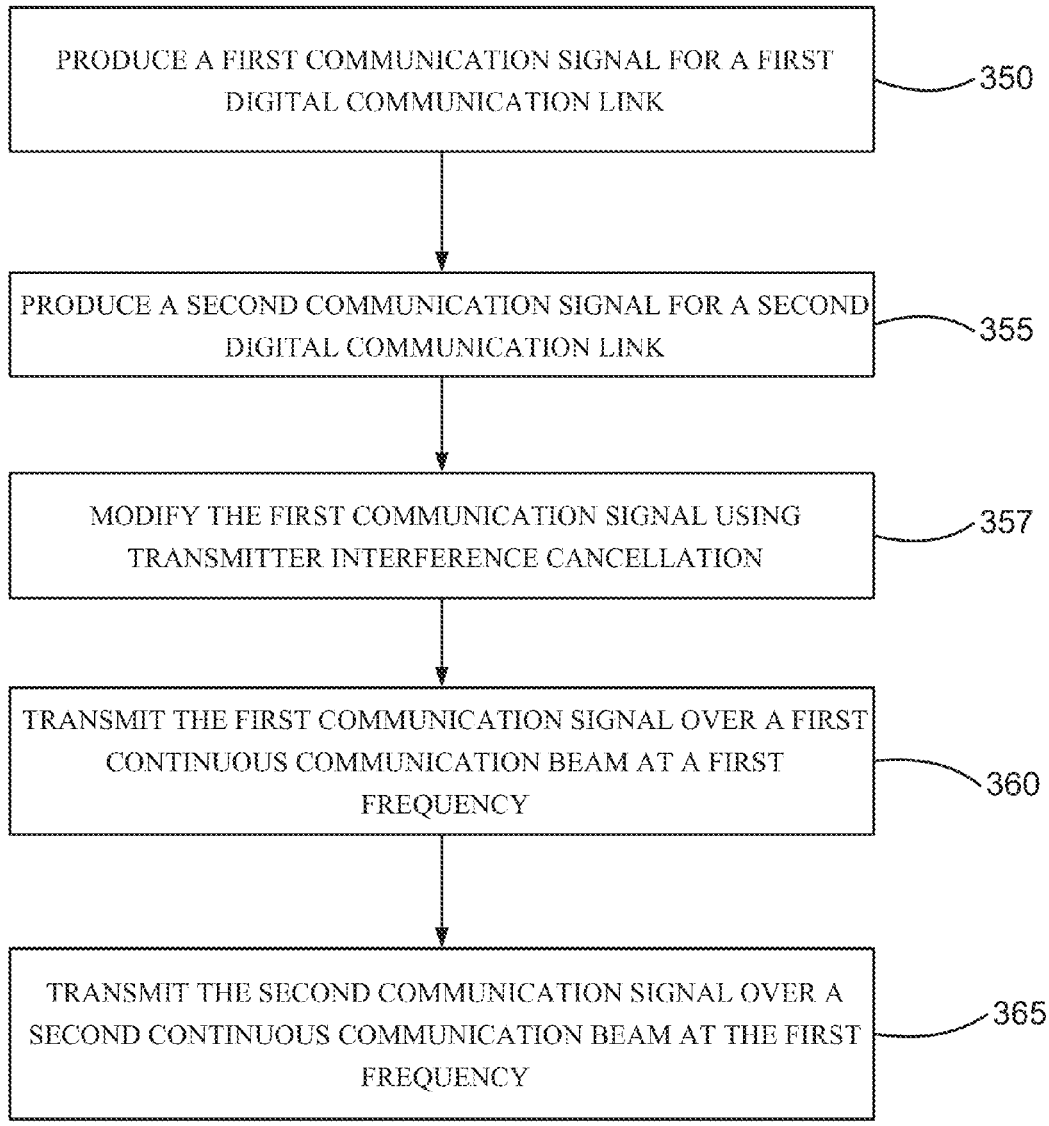
FIG. 4A is a simplified flow chart illustrating a method of calculating pre-coder coefficients, according to an example embodiment of the invention.

Reference is now made to FIG. 4A, which is a simplified flow chart illustrating a method of calculating pre-coder coefficients, according to an example embodiment of the invention.

The example embodiment of FIG. 4A is a method for interference reduction in transmission of at least two single carrier continuous communication beams including:

producing a first communication signal for a first digital communication link (350);

producing a second communication signal for a second digital communication link (355);

characterized by modifying the first communication signal using transmitter interference cancellation (357);

transmitting the first communication signal over a first continuous communication beam at a first frequency (360); and transmitting the second communication signal over a second continuous communication beam at the first frequency (365).

The example of FIG. 4A generally describes an embodiment of the invention at a level of detail similar to the block diagram of FIG. 2A.

Figure 4B:
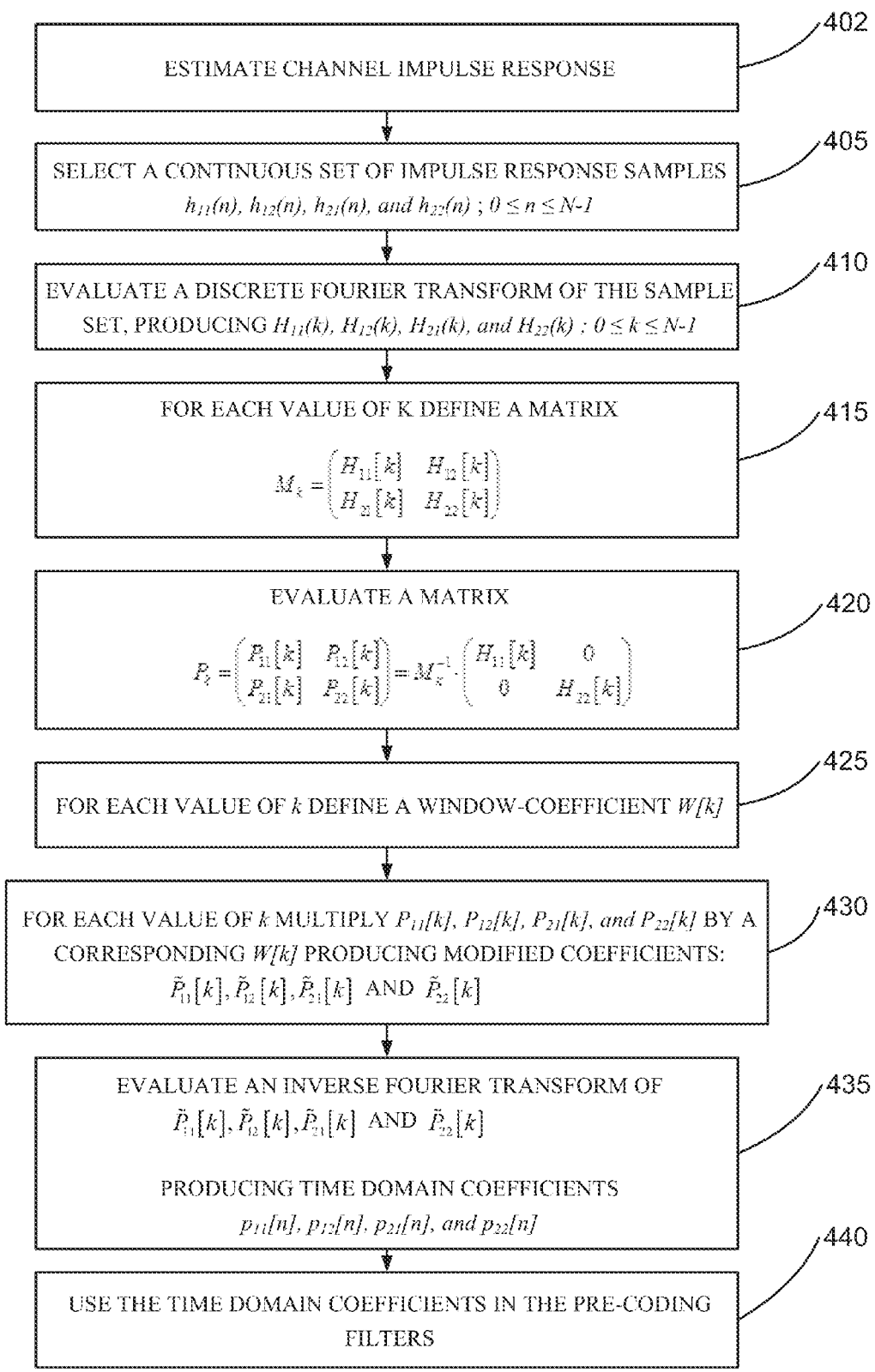
FIG. 4B is a simplified flow chart illustrating a method of calculating pre-coder coefficients, according to another example embodiment of the invention.

Reference is now made to FIG. 4B, which is a simplified flow chart illustrating a method of calculating pre-coder coefficients, according to another example embodiment of the invention.

Estimate a successive set of channel impulse response samples (402).

Based on the channel impulse response estimation, calculate pre-coder coefficients as follows:

Select a successive set of impulse response samples to work with. Denote the number of samples by N. Denote the set of samples by $h_{11}(n)$, $h_{12}(n)$, $h_{21}(n)$, and $h_{22}(n)$ where $0 \le n \le N-1$ (405).

Evaluate a discrete Fourier transform of the sample set. Denote the corresponding Fourier coefficients by $H_{11}(k)$, $H_{12}(k)$, $H_{21}(k)$, and $H_{22}(k)$ correspondingly, where $0 \le k \le N-1$ (410).

For each value of k define a matrix $$M_k = \begin{pmatrix} H_{11}[k] & H_{12}[k] \\ H_{21}[k] & H_{22}[k] \end{pmatrix}. \quad (415)$$

For each matrix $M_k$ evaluate a matrix $$P_k = \begin{pmatrix} P_{11}[k] & P_{12}[k] \\ P_{21}[k] & P_{22}[k] \end{pmatrix} = M_k^{-1} \cdot \begin{pmatrix} H_{11}[k] & 0 \\ 0 & H_{22}[k] \end{pmatrix}. \quad (420)$$

For each value of k define a window-coefficient W[k] (425). The window coefficients may be selected using standard window functions commonly used in digital signal processing, such as a Hamming window, a Chebyshev window, and so on.

For each value of k multiply the coefficients $P_{11}[k]$, $P_{12}[k]$, $P_{21}[k]$, and $P_{22}[k]$ by a corresponding window coefficient W[k], producing a set of modified coefficients: $\tilde{P}_{11}[k]$, $\tilde{P}_{12}[k]$, $\tilde{P}_{21}[k]$ and $\tilde{P}_{22}[k]$ (430).

Evaluate an inverse Fourier transform of the vectors $\tilde{P}_{11}[k]$, $\tilde{P}_{12}[k]$, $\tilde{P}_{21}[k]$ and $\tilde{P}_{22}[k]$, producing sets of time domain coefficients: $p_{11}[n]$, $p_{12}[n]$, $p_{21}[n]$, and $p_{22}[n]$ (435).

Use the set of time domain coefficients as coefficients for the pre-coding filters.

In some embodiments of the invention an alternative method for obtaining the pre-coder coefficients from the channel impulse response is used, based on adaptively updating the coefficients in such a way which minimizes error, by way of a non-limiting example by minimizing a larger mean-square-error among the two remote receivers. This approach is illustrated in FIG. 5.

Figure 5:
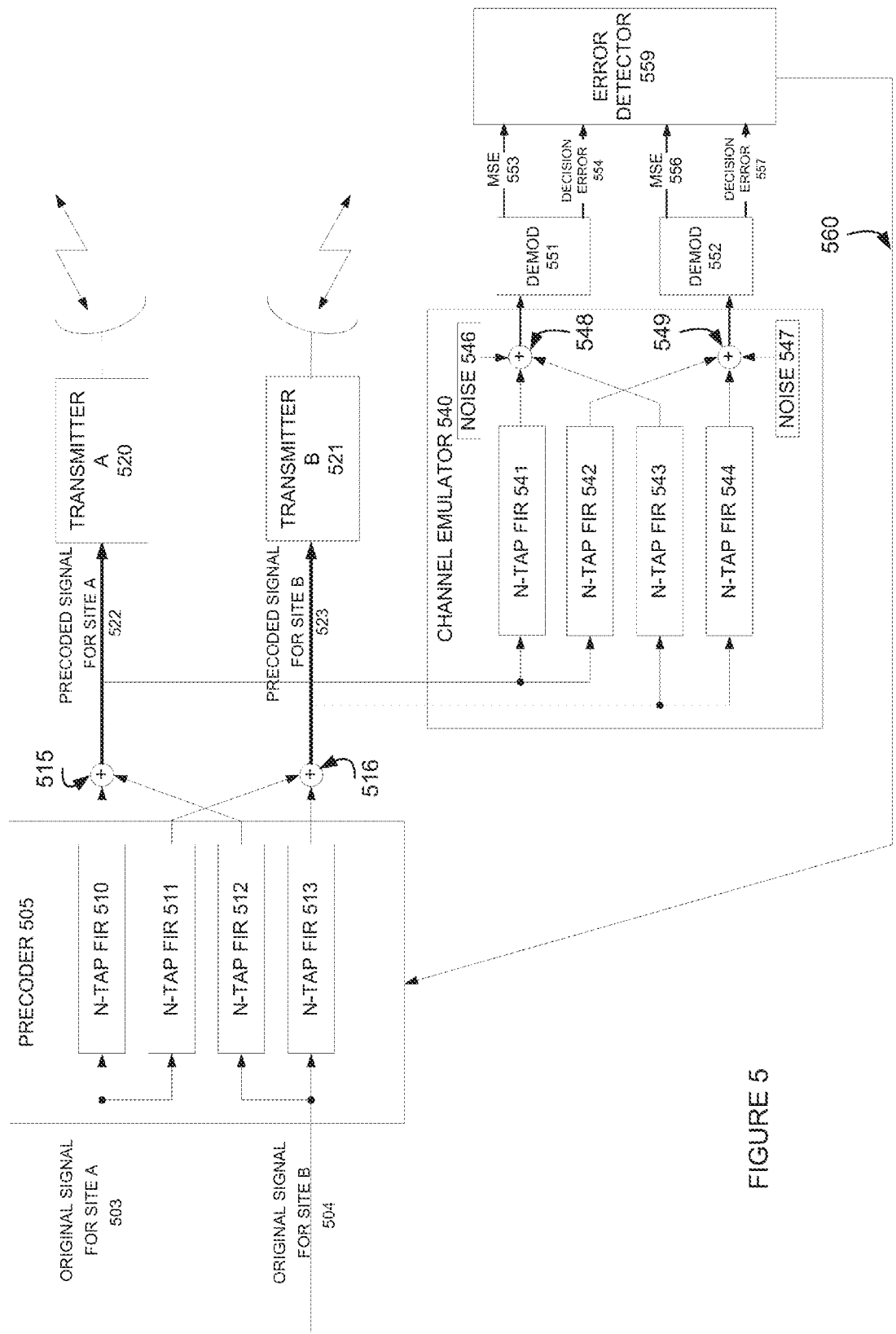
FIG. 5 is a simplified block diagram illustration of an alternative method for obtaining pre-coder coefficients, according to an example embodiment of the invention.

Reference is now made to FIG. 5, which is a simplified block diagram illustration of an alternative method for obtaining pre-coder coefficients, according to an example embodiment of the invention.

An aggregation point includes units for cancelling interference, constructed according to an example embodiment of the invention. The units includes a pre-coder 505 with four N-tap FIRs 510 511 512 513; two signal adders 515 516; a transmitter A 520 for transmitting to a node A, and a transmitter B 521 for transmitting to a node B.

The pre-coder 505 has two inputs, an input signal for site A 503 and an input signal for site B 504. The input signal for site A 503 is split in two, and fed into two of the FIRs 510 511 and the input signal for site B 504 is split in two, and fed into two of the filters 512 513. Output from two of the filters 510 512 is provided to a signal adder 515, and output from two of the filters 511 513 is provided to a signal adder 516. The adders 515 516 each produce a pre-coded signal for site A 522 and a pre-coded signal for site B 523. The pre-coded signal for site A 522 and the pre-coded signal for site B 523 are each fed into transmitter A 520 and transmitter B 521 respectively, and transmitted to site A and site B respectively.

The pre-coded signal for site A 522 and the pre-coded signal for site B 523 are also split off, and fed into a channel emulator 540. The channel emulator 540 optionally emulates a communication channel from transmitter A 520 to the site A, and a communication channel from transmitter B 521 to the site B, that is, optionally acts as one or more channel emulators. The pre-coded signal for site A 522 is split in two, and fed into two FIRs 541 542 and the pre-coded signal for site B 523 is split in two, and fed into two FIRs 543 544.

A signal adder 548 mixes signals from the FIR 541 of the site A signal, from the FIR 543 of the site B signal, and from a noise emulator 546 of the site A channel, producing an output which emulates a communication beam to site A which includes the pre-coded signal for site A, mixed with an interfering pre-coded signal for site B, and with noise associated with the communication channel to site A.

A signal adder 549 mixes signals from the FIR 542 of the site A signal, from the FIR 544 of the site B signal, and from a noise emulator 547 of the site B channel, producing an output which emulates a communication beam to site B, which includes the pre-coded signal for site B, mixed with an interfering pre-coded signal for site A, and with noise associated with the communication channel to site B.

Output from the signal adders 548 549 is fed into demodulators 551 552 respectively.

Output from the demodulators 551 552 has passed through an entire channel emulation for both the channel to site A and the channel to site B, while still at the aggregator site.

In some embodiments of the invention, the demodulators 551 and 552 optionally estimate a Mean Square Error (MSE 553) rate of the channel to site A and a MSE rate of the channel to site B (MSE 556).

In some embodiments of the invention, the demodulators 551 and 552 optionally estimate a decision error rate 554 of the channel to site A and a decision error rate 557 of the channel to site B.

In some embodiments of the invention, the demodulators 551 and 552 estimate both the MSE rates 553 556 and the decision error rates 554 557.

An error rate is optionally fed back to the pre-coder 505 via an optional dedicated channel 560.

In some embodiments of the invention, the MSE 553 is fed back.

In some embodiments of the invention, the MSE 556 is fed back.

In some embodiments of the invention, the decision error rate 554 is fed back.

In some embodiments of the invention, the decision error rate 557 is fed back.

In some embodiments of the invention, an optional error detector 559 selects which of the MSE 553 556 and the decision error rates 554 557 is to be fed back via the optional dedicated channel 560. Optionally, the error detector 559 selects the worst error rate. Optionally, the error detector 559 selects an error rate belonging to a site channel which a user, such as a technician, indicates as a channel for which error rates should be minimized.

It is noted that optimizing both the pre-coded signal for site A 522 and the pre-coded signal for site B 523 may involve two contradictory requirements. Both the demodulator 551 and the demodulator 552 may seek to optimize their MSE, but an optimal solution for the demodulator 551, eliminating the pre-coded signal for site B 523 completely, is bad for the pre-coded signal for site B 523.

FIG. 5 depicts an example case in which two sets of performance measures have been calculated—for a signal intended for site A and for a signal intended for site B. One option is to select as a performance measure a worse MSE (between the signal intended for site A and the signal intended for site B) and provide the worse MSE as feedback to the pre-coder 505. The pre-coder 505 optionally modifies coefficients, for example by a smart search, so as to improve the performance measure received as feedback.

In some cases the signal intended for site A and the signal intended for site B, use different modulations. By way of a non-limiting example, the signal intended for site A is modulated as a 16 QAM signal, and the signal intended for site B is modulated as a 256 QAM signal. In such a case, the signal intended for site B should have a significantly better MSE than the signal intended for site A, so the feedback signal to the pre-coder 505 would optionally consist of the MSE of the demodulator which is more "stressed", that is, the demodulator of the signal intended for site B.

Typically, Performance is measured for A and B signals. a decision is made which signal requires improvement, and the MSE of the signal requiring improvement is optionally sent to the pre-coder 505 as feedback. MSE was mentioned above, as an example. Error rate may be used as well as other performance measures.

Optionally, a combination of performance indicators may be used as feedback, such as: a sum of error rates; a sum of mean-square-errors. The feedback may optionally include an actual error of each received symbol, which is useful if a Least Mean Squares (LMS) method is used for optimizing the pre-coder filter coefficients.

The pre-coder 505 updates FIR coefficients in order to optimize a performance measure, by way of a non-limiting example to minimize the error rate. The FIR coefficients are updated to minimize the error rate using, for example, a Least Mean Squares (LMS) method. LMS methods are a class of adaptive filter used to mimic a desired filter by finding filter coefficients that relate to producing a least mean squares of the error signal (difference between the desired and the actual signal).

An alternative approach for evaluating the pre-coder coefficients is to feedback decision errors in the remote receivers of site A and/or of site B to the aggregation point using a dedicated channel from the remote site to the aggregation point. The aggregation point optionally evaluates the error rate of each receiver, and optionally selects an error rate to use in updating the pre-coder coefficients.

In some embodiments of the invention, when implementing the above alternative approach, channel delay also needs to be compensated for. By feeding back actual individual decision errors, and by knowing the delay in the channel, the set of samples which was in the pre-coder when a symbol which resulted in a given error is known. Since the set of samples is known, coefficients are optionally updated so as to decrease the error. In some embodiments of the invention, that is how LMS is implemented.

In some embodiments of the invention, LMS is implemented by sending the error once every number of samples. This saves feedback bandwidth. The pre-coder optionally updates coefficients only when it receives an error value.

Yet another alternative approach for reducing interference between two transmission beams is to have the two antennas which transmit the beams transmit signals with phase shifts such that the signal which is intended for tail-site A is transmitted with a beam which nulls or at least significantly attenuates in the direction of site B and vice versa. The phase shifts are obtained, for example, from a set of receivers in the aggregation site which use channel emulation similar to that described above with reference to FIG. 5, and interference error minimization similar to that described above with reference to FIG. 5, to discover appropriate phase shifts.

Receivers of the aggregation point are described in more detail below, with reference to FIG. 7B and to the section named "Cancelling Mutual Interference between Tail-Site Transmissions".

It is again noted that examples brought in the present application include cases with two transmission directions, to a site A and a site B. The descriptions of the examples are extendable to more than two transmission directions, by a person skilled in the art. Suffice it to say that the channel emulator 540 would emulate signals for more than the two sites A and B, and/or the optional error detector 559 would select between MSE rates and/or decision error rates of more than the two sites A and B.

Feedback and optimization are now described again.

In some embodiments, the pre-coder receives feedback with mean performance measures, such as MSE and error rate, and in some embodiments the pre-coder receives feedback with actual decision errors.

In some embodiments the feedback comes from a local channel emulator plus demodulators, and in some embodiments feedback comes from actual receivers.

When provided with mean performance measures, the pre-coder optionally searches for a solution which optimizes the mean performance measures. The search may optionally include a simple search, such as, for example: starting to shift a coefficient in one direction, if performance improves continuing in the same direction, if performance degrades, shifting the coefficient in the other direction, or stopping shifting its value and skipping to another coefficient.

In some embodiments, better search methods are used. For example, down-hill search using the Nelder-Mead simplex method, which is known in the art, and which performs search in a more efficient way than the above described simple search.

In some embodiments the pre-coder is fed with individual decision errors. The pre-coder optionally inspects the data which resulted in the error. The pre-coder then slightly modifies the coefficients in a way which reduces the error.

In some embodiments of the invention, channel delay is taken into account. In order to match an error to the data in the pre-coder the delay needs to be known.

Regardless of the method used or optimization, pre-coder coefficients, optionally for signals intended for both node A and node B, are modified. A purpose of the modification is to decrease mean error and/or individual error.

In some embodiments of the invention, when two, or more, performance measures are provided to the pre-coder, the pre-coder optionally searches for a solution in which both performance measures are better than a given requirement or some other criterion.

Figure 6:
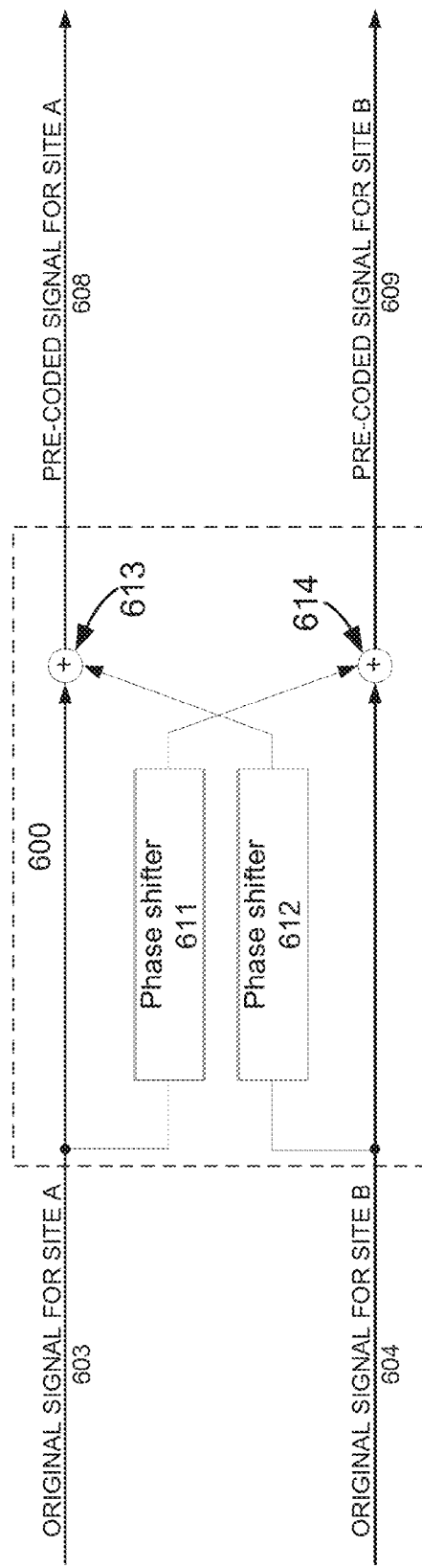
FIG. 6 is a simplified block diagram of a pre-coding unit constructed according to an example embodiment of the invention.

Reference is now made to FIG. 6, which is a simplified block diagram of a pre-coding unit 600 constructed according to an example embodiment of the invention.

The pre-coding unit 600 accepts inputs of an original signal for site A 603 and an original signal for site B 604. The pre-coding unit 605 includes two phase shifters 611 612, and two adders 613 614.

The original signal for site A 603 is split, and part of the original signal for site A 603 is fed through a first phase shifter 611, where the phase of the original signal for site A 603 is shifted, and an output of the first phase shifter 611 is added, at a first adder 614, to the original signal for site B 604, and outputs a pre-coded signal for site B 609.

The original signal for site B 604 is split, and part of the original signal for site B 604 is fed through a second phase shifter 612, where the phase of the original signal for site B 604 is shifted, and an output of the second phase shifter 612 is added, at a second adder 613, to the original signal for site A 603, and outputs a pre-coded signal for site A 608.

The pre-coded signal for site B 609 and the a pre-coded signal for site A 608 are optionally fed into transmitters (not shown) for site B (not shown) and for site A (not shown), as described above with reference to FIGS. 2A, 2B, and 5.

Cancelling Mutual Interference Between Tail-Site Transmissions Received at an Aggregation Point An aggregation point optionally cancels mutual interference between two received signals using interference cancellation techniques such as, for example, interference cancellation which are used for cancelling interference between two polarizations.

In some embodiments of the invention the receivers are based on adaptive equalizers. Two received signals are each passed through an equalizer. The equalizers' outputs are summed. The equalizers' coefficients are updated so as to optimize the signal at the sum output. Optimization may optionally be done with a simple decision-directed or Data-Aided LMS algorithm.

Figure 7A:
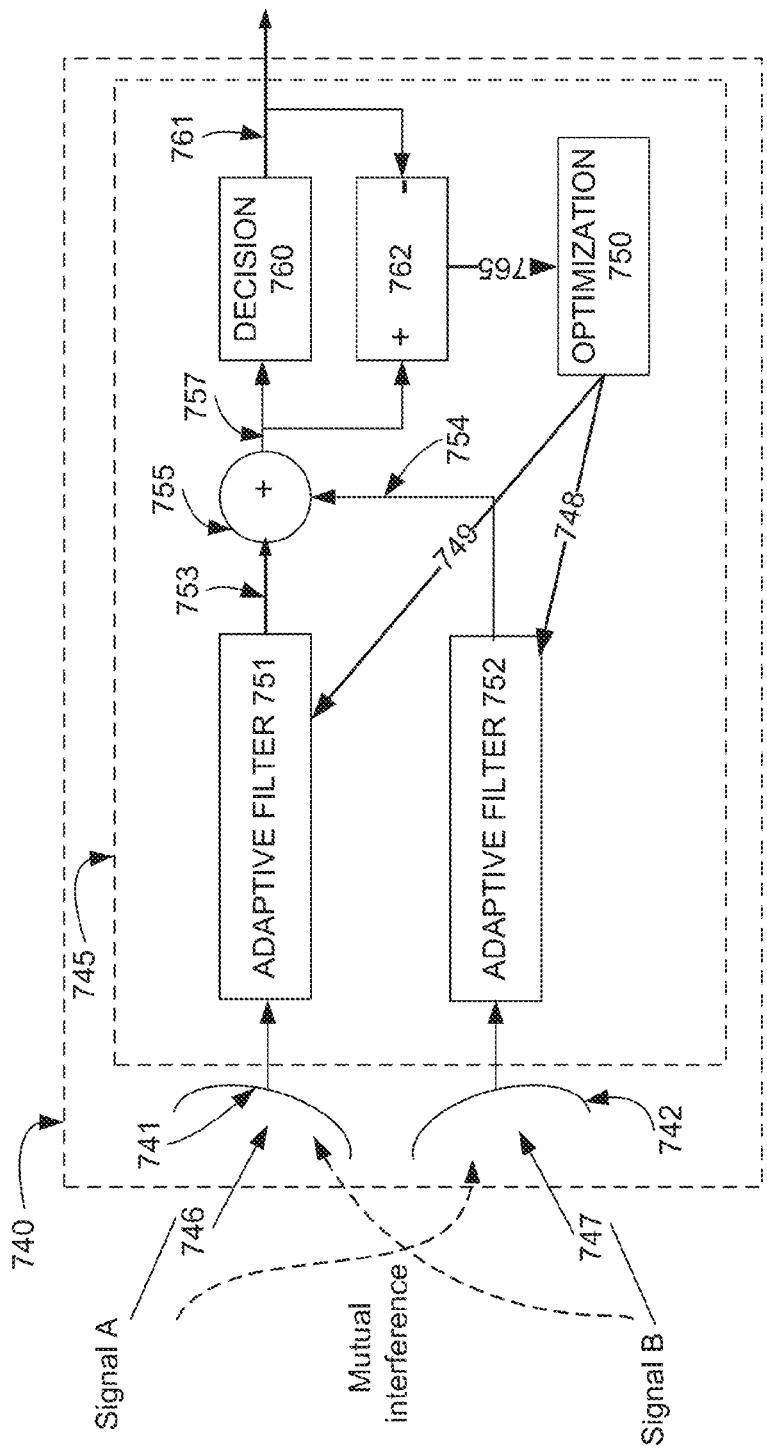
FIG. 7A is a simplified block diagram illustration of an aggregation point having a receiving interference cancelling unit constructed and operational according to an example embodiment of the invention.

Reference is now made to FIG. 7A, which is a simplified block diagram illustration of an aggregation point 740 having a receiving interference cancelling unit 745 constructed and operational according to an example embodiment of the invention.

The aggregation point 740 includes two antennas 741 742, each of which receives a different combination of a communication signal 746 from site A, and communication signal 747 from site B, due to mutual interference. The received combinations of signals 746 747 are input into the receiving interference cancelling unit 745.

In the interference cancelling unit 745 the combinations of signals 746 747 each pass through an adaptive filter 751 752. The adaptive filters 751 752 receive filter coefficients 765 as feedback from later in the signal flow, and coefficients of the adaptive filters 751 752 set so as to minimize decision errors.

The adaptive filters 751 752 produce output signals 753 754 which are fed into an adder 755. An output signal 757 produced by the adder 755 corresponds, by way of example, to a signal 746 from the site A, with a reduced interference level.

The output signal 757 is fed in a decision unit 760, which decides which symbol was received in the output signal 757, and produces an output signal 761, which is a decision regarding a transmitted symbol. The output signal 757 is also fed into a subtracting unit 762, which also receives the output signal 761 of the decision unit 760.

The subtracting unit 762 subtracts the symbol which is the output signal 761 from the noisy output signal 757. After subtraction, a noise and interference signal 765 is left over, and produced as output of the subtracting unit 762. The noise and interference signal 765 is sent to an optimization unit 750. The optimization unit 750 produces filter coefficients 748 749 for the adaptive filters 751 752.

In some embodiments the optimization unit 750 optionally updates coefficients of the adaptive filters 751 752 so as to minimize mean-square-error (MSE) of the output signal 757 of the adder 755.

In the embodiment of FIG. 7A the optimization unit 750 optionally updates coefficients of the adaptive filters 751 752 so as to minimize the noise and interference signal 765. The minimization is performed according to any one of several algorithms, such as, by way of some non-limiting examples: a least-mean-square (LMS) algorithm, a least-squares algorithm, and a recursive-least-squares algorithm.

One method of minimizing decision errors includes training the interference cancelling unit 745 with a known sequence of symbols. The optimization unit 750 can then use a least-mean-square (LMS) method to update coefficients of the adaptive filters 751 752 so as to minimize mean-square-error (MSE) of the output signal 757 of the adder 755. Once the coefficients have converged to a satisfactory solution in which decision errors are rare, the interference cancelling unit 745 can optionally switch to real data, and have the adaptive filters track channel changes.

It is noted that the example embodiment illustrated in FIG. 7A optionally lessens interference from the signal 747 from site B. By adding two more adaptive filters (not shown), an adder (not shown), and feedback from decision units for the signal 747 for site B, a corresponding interference cancelling is optionally constructed for the signal 747 for site B.

FIG. 7A illustrates interference cancellation with two adaptive filters 751 752, optionally equalizers. Optionally, Bit-Error Rate (BER) is not calculated by the interference cancelling unit 740, so the example embodiment of FIG. 7A does not directly optimize BER. In the example embodiment of FIG. 7A, an optimization criterion addresses decision errors, resulting in a minimal mean-square-decision-error, or MSE for short.

The example embodiment of FIG. 7A is good for use in an aggregation point.

Figure 7B:
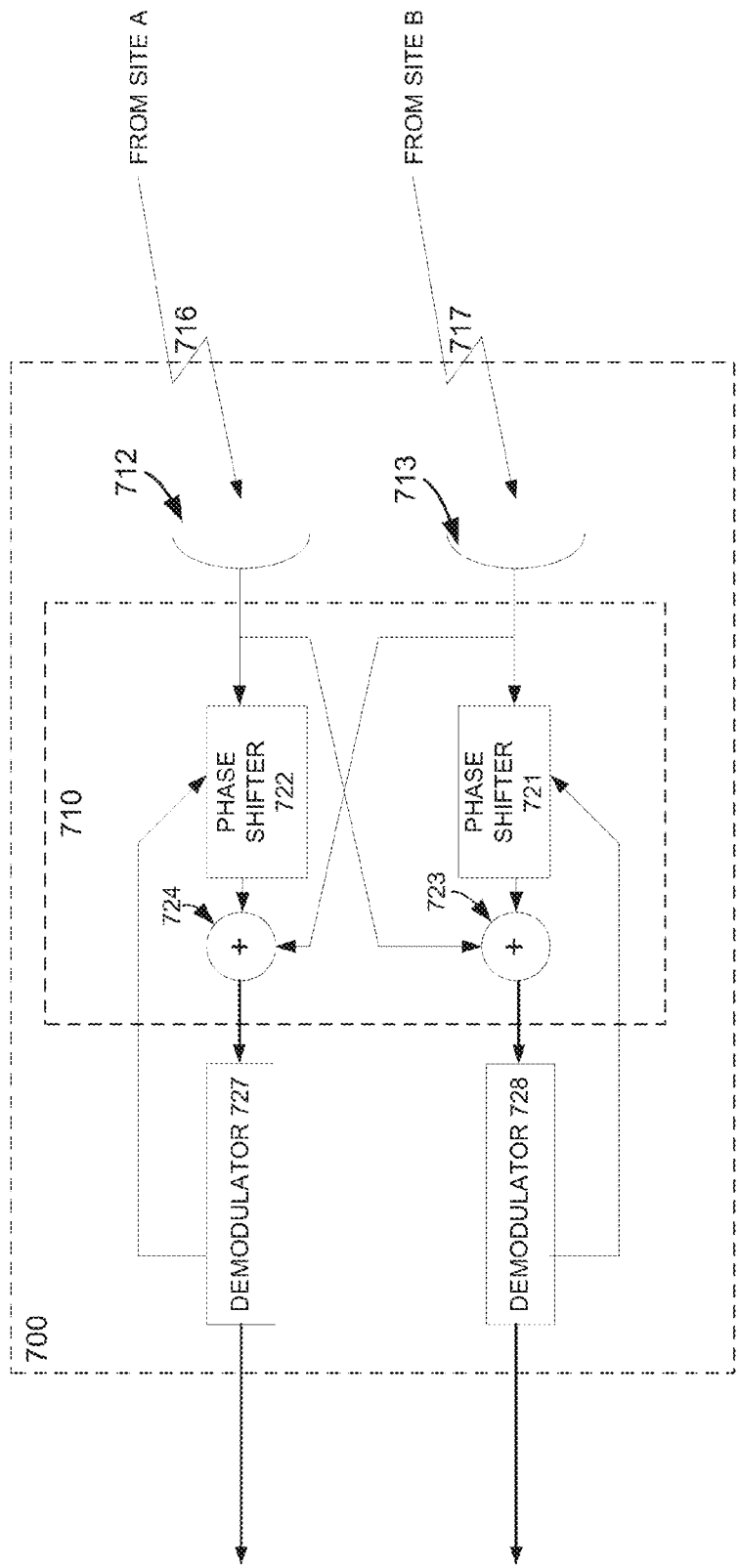
FIG. 7B is a simplified block diagram illustration of an aggregation point having a receiving interference cancelling unit constructed and operational according to another example embodiment of the invention.

Reference is now made to FIG. 7B, which is a simplified block diagram illustration of an aggregation point 700 having a receiving interference cancelling unit 710 constructed and operational according to another example embodiment of the invention.

FIG. 7B illustrates a phase shift approach to cancelling mutual interference between tail site transmissions received at an aggregation point The aggregation point 700 includes two antennas 712 713, receiving a communication signal 716 from site A, and a communication signal 717 from site B, respectively. The received signals 716 717 are input into the receiving interference cancelling unit 710. In the receiving interference cancelling unit 710 the signals 716 717 are split, one part of each signal going through one of two phase shifters 721 722, and another part of each signal going directly to one of two adders 723 724, which add the direct signal to phase shifted output of the phase shifters 721 722.

Output from the adders 723 724 goes to a first demodulator 727 and a second demodulator 728. The first demodulator 727 demodulates a sum of the communication signal 717 from site B and a phase shifted communication signal 716 from site A, and the second modulator 728 demodulates a sum of communication signal 716 from site A and a phase shifted communication signal 717 from site B.

The example embodiment depicted in FIG. 7B includes shifting a relative phase between a portion of the two received signals 716 717 before summing to the other portion of the two received signals 716 717. The relative phase shift is optionally such that a first one of the signals is cancelled and a second of the signals remains. The phase shifting and adding of the two received signals is equivalent to nulling a signal from a direction of interference. Using a second, different phase shift, the second one of the signals is cancelled and the first of the signals remains.

In some embodiments of the invention an optional mechanism for adjusting the phase shifts is based on an LMS or similar algorithm, as described above with reference to FIG. 5.

In some embodiments of the invention an optional mechanism for adjusting the phase shifts scans for no interference, and/or a best MSE.

Interference is optionally detected by searching for a correlation with a known sequence of the interfering signal.

It is noted that the phase shifts obtained as described with reference to FIG. 7B may optionally be used for the pre-coder of FIG. 6.

In some embodiments of the invention an optional mechanism for adjusting the interference, error rate, or MSE, is based on modifying the communication signal 716 from site A and the communication signal 717 from site B using an N-tap filter such as the filters 510 511 512 513 instead of phase shifting by the phase shifters 721 722. An optional mechanism for adjusting filter coefficient may be based on an LMS or similar algorithm, as described above with reference to FIG. 5.

As will be described below, reducing interference in an aggregation point receiver, enables the aggregation point to discover parameters used in reducing the interference, and use the parameters to reduce interference when transmitting from the aggregation point.

Figure 7C:
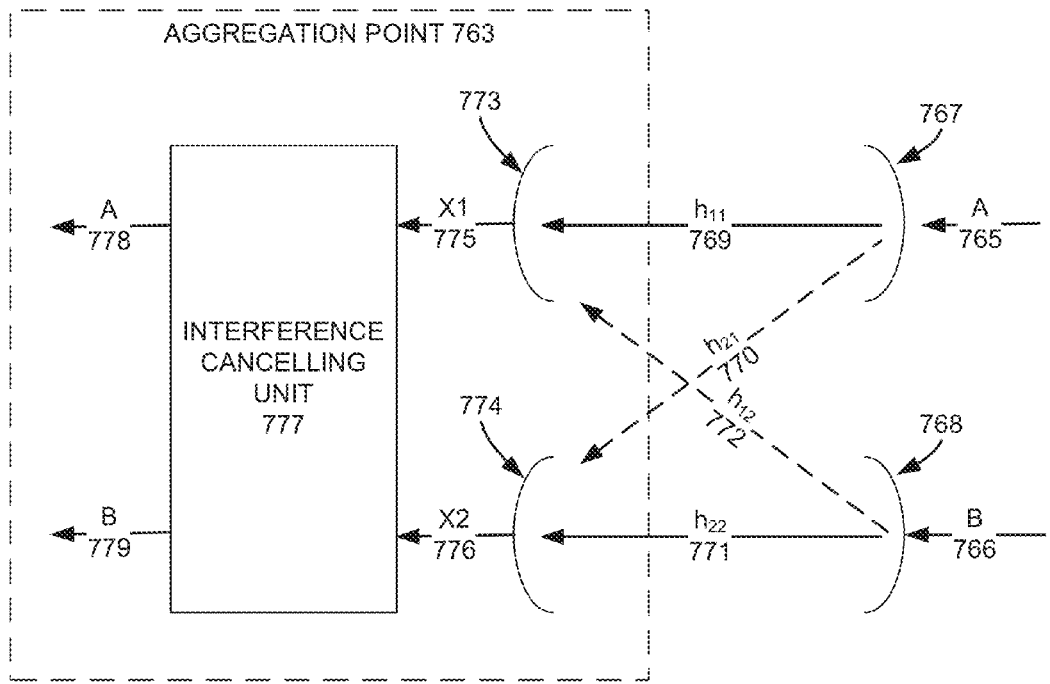
FIG. 7C is a simplified block diagram illustration of an aggregation point using an interference cancelling unit for reducing received interference, constructed and operational according to another example embodiment of the invention.

Reference is now made to FIG. 7C, which is a simplified block diagram illustration of an aggregation point 763 using an interference cancelling unit 777 for reducing received interference, constructed and operational according to another example embodiment of the invention.

FIG. 7C depicts the interference cancelling unit 777 emphasizing a leakage of interfering communication links.

A signal 765 is broadcast via an antenna 767 from a site A, and a signal 766 is broadcast via antenna 768 from a site B.

An antenna 773 at the aggregation point 763 receives an intended signal 769 from site A, and a leakage signal 772 from site B. An antenna 774 at the aggregation point 763 receives an intended signal 771 from site B, and a leakage signal 770 from site A.

The antenna 773 passes a combined signal X1 775, which includes the intended signal 769 from site A, and the leakage signal 772 from site B. The antenna 774 passes a combined signal X2 776, which includes the intended signal 771 from site B, and the leakage signal 770 from site A.

The interference cancelling unit 777 modifies the combined signal X1 775, reducing interference as much as possible, and produces an output signal A 778, which is substantially equal to the signal 765 broadcast from site A. The interference cancelling unit 777 modifies the combined signal X2 776, reducing interference as much as possible, and produces an output signal B 779, which is substantially equal to the signal 766 broadcast from site B.

Obtaining the signals A 778 and B 779 from the input mixtures X1 775 and X2 776 is represented as follows:

$$\begin{pmatrix} A \\ B \end{pmatrix} = \begin{pmatrix} a_1 \cdot e^{j\theta 1} & b_1 \cdot e^{j\phi 1} \\ a_2 \cdot e^{j\theta 2} & b_2 \cdot e^{j\phi 2} \end{pmatrix} \cdot \begin{pmatrix} X1 \\ X2 \end{pmatrix} \quad \text{Equation 1}$$

Generally:

$$\begin{pmatrix} A \\ B \end{pmatrix} = M \cdot \begin{pmatrix} X1 \\ X2 \end{pmatrix} \quad \text{Equation 2}$$

where M denotes the matrix in Equation 1.

The signals X1 775 and X2 776 were received by the receiving antennas 773 774 after the signals A 765 and B 766 were transmitted. In other words, the signals A 765 and B 766 were transmitted and the communication channel caused them to mix into X1 775 and X2 776. The mixing, or interference, is denoted by Equation 3:

$$\begin{pmatrix} X1 \\ X2 \end{pmatrix} = H \cdot \begin{pmatrix} A \\ B \end{pmatrix} = \begin{pmatrix} h11 & h12 \\ h21 & h22 \end{pmatrix} \cdot \begin{pmatrix} A \\ B \end{pmatrix} \quad \text{Equation 3}$$

where H denotes a simplified channel matrix.

FIG. 7C illustrates the channel mixing, and subsequent separation. The interference cancelling unit 777 performs a function of multiplying a vector $$\begin{pmatrix} X1 \\ X2 \end{pmatrix}$$

by matrix $$M = \begin{pmatrix} a_1 \cdot e^{j\theta_1} & b_1 \cdot e^{j\phi_1} \\ a_2 \cdot e^{j\theta_2} & b_2 \cdot e^{j\phi_2} \end{pmatrix},$$

as described above in Equation 1.

The interference cancelling unit 777 optionally finds a set of parameters $a_1, a_2, b_1, b_2, \theta_1, \theta_2, \phi_1,$ and $\phi_2$ so as to minimize interference, by way of a non-limiting example by minimizing MSE or BER, optionally as described above with reference to FIGS. 7A and 7B.

When the set of parameters, or coefficients, $a_1, a_2, b_1, b_2, \theta_1, \theta_2, \phi_1,$ and $\phi_2$ are known, the same set is optionally used for modifying one or both of the signals to the sites A and B producing pre-coded signals to the sites A and B.

Figure 7D:
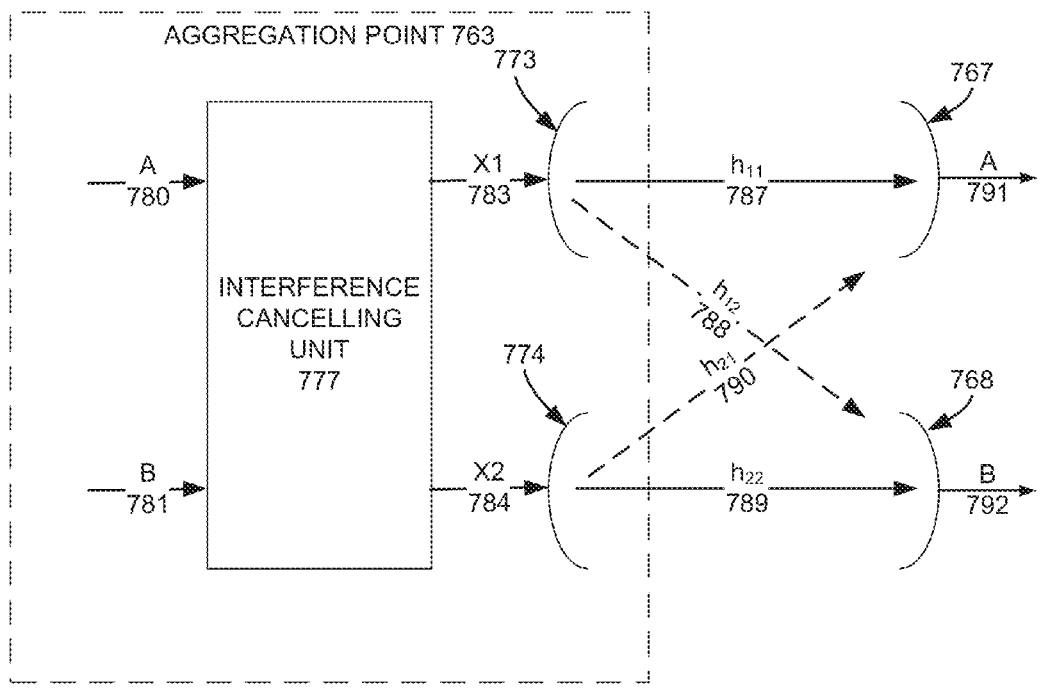
FIG. 7D is a simplified block diagram illustration of the aggregation point of FIG. 7C, using the interference cancelling unit for reducing transmission interference.

Reference is now made to FIG. 7D, which is a simplified block diagram illustration of the aggregation point 763 of FIG. 7C, using the interference cancelling unit 770 for reducing transmission interference.

A signal A 780, intended for a site A, is optionally fed into an interference cancelling unit 777, and a signal B 781, intended for a site B, is optionally fed into the interference cancelling unit 777.

The interference cancelling unit 777 modifies the signals A 780 and B 781, producing output of signals X1 783 and X2 784 respectively, as will be explained below.

The signals X1 783 and X2 784 are broadcast by antennas 773 and 774 respectively, intended for antennas 767 768 at site A and site B respectively.

The antenna 767 at site A receives a signal 787 intended for site A and a leakage signal 790 intended for site B, combining the two signals as a combined signal 791. The antenna 768 at site B receives a signal 789 intended for site B and a leakage signal 788 intended for site A, combining the two signals as a combined signal 792.

The interference cancelling unit 777 modifies the signals A 780 and B 781 so that after passing through their respective communication channels, and suffering leakage which causes interference, the received signal 791 at site A and received signal 792 at site B will be best resemble the signals A 780 and B 781.

From Equations 2 and 3 it is seen that it is possible that have $M=H^{-1}$.

FIG. 7D illustrates a case where roles of transmitters and receivers are switched relative to FIG. 7C.

The communication channel is often substantially reciprocal, that is, the channel modifies signals similarly when the transmitters are switched with the receivers, or when the signals pass through the communications channels in the opposite direction.

The communication channel of FIG. 7D is modeled by $H^T$ matrix, which is the transposed matrix of the communication channel of FIG. 7C.

$$\begin{pmatrix} A \\ B \end{pmatrix} = H^T \cdot \begin{pmatrix} X1 \\ X2 \end{pmatrix} = \begin{pmatrix} h11 & h21 \\ h12 & h22 \end{pmatrix} \cdot \begin{pmatrix} X1 \\ X2 \end{pmatrix} \quad \text{Equation 4}$$

When the coefficients $a_1, a_2, b_1, b_2, \theta_1, \theta_2, \phi_1,$ and $\phi_2$ of the matrix M are known, a useful pre-coding matrix for reducing interference is $M^T$. It is noted that when $M=H^{-1}$, then $M^T = (H^T)^{-1}$.

The interference cancelling unit 777 performs the following calculation:

$$\begin{pmatrix} X1 \\ X2 \end{pmatrix} = \begin{pmatrix} a_1 \cdot e^{j\theta_1} & a_2 \cdot e^{j\theta_2} \\ b_1 \cdot e^{j\phi_1} & b_2 \cdot e^{j\phi_2} \end{pmatrix} \cdot \begin{pmatrix} A \\ B \end{pmatrix} \quad \text{Equation 5}$$

optionally producing the signals X1 783 and X2 784, which, after passing through their respective communication channels, are substantially equal to the signal A 780 and the signal B 781.

Figure 8:
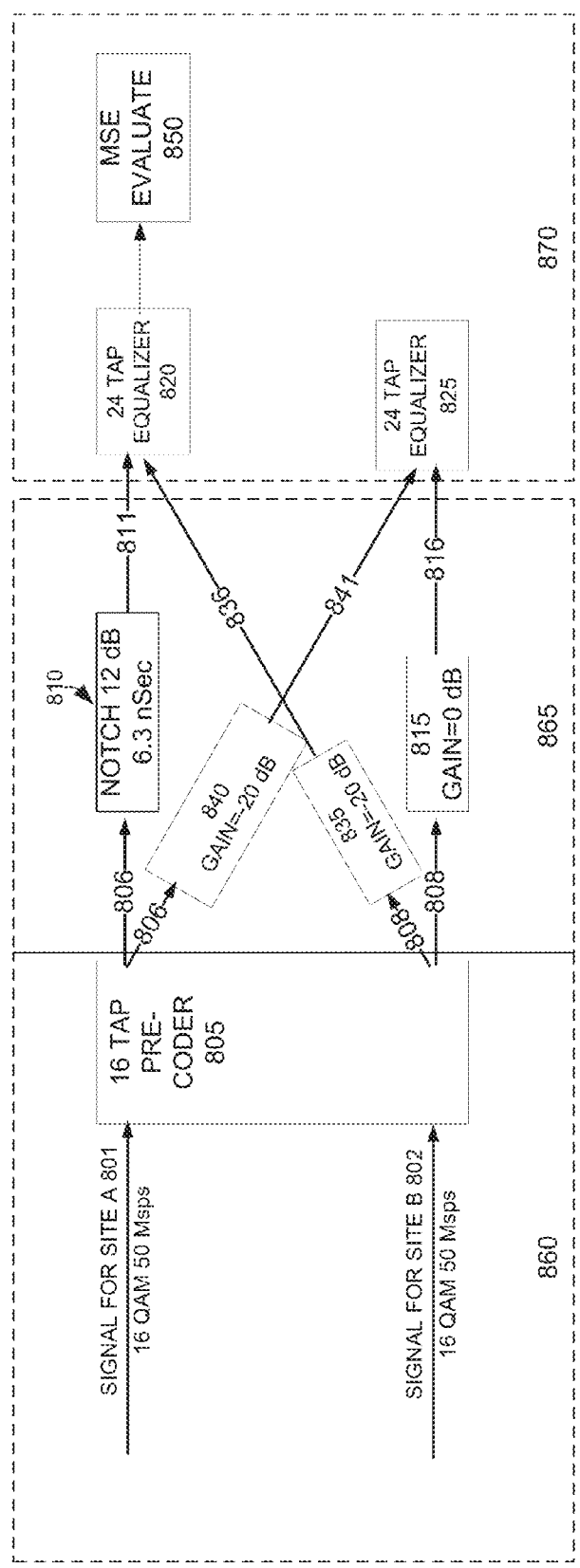
FIG. 8 is a simplified block diagram illustration of a setup which was used to simulate interference cancellation according to an example embodiment of the invention.

Reference is now made to FIG. 8, which is a simplified block diagram illustration of a setup which was used to simulate interference cancellation according to an example embodiment of the invention.

Figure 9A:
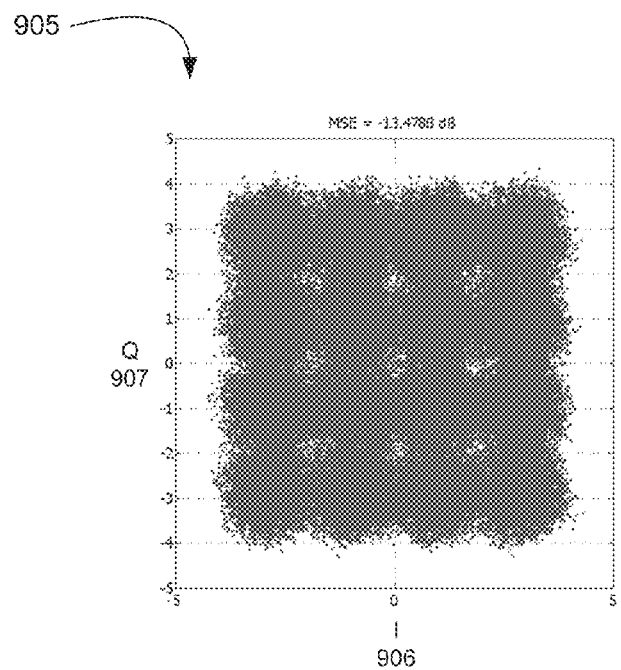
FIG. 9A is a constellation diagram for rectangular 16 QAM produced as a result of simulating interference between two communication channels without interference cancellation according to the present invention.
Figure 9B:
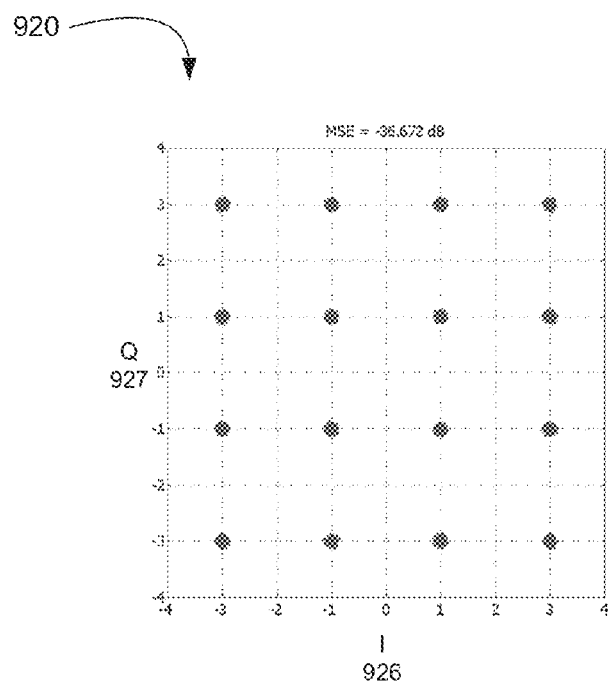
FIG. 9B is a constellation diagram for rectangular 16 QAM produced as a result of simulating interference between two communication channels with interference cancellation according to the present invention.

The setup of FIG. 8 will now be described with reference to two different cases, a first case simulating interference between two communication channels without interference cancellation according to the present invention, and a second case simulating interference between two communication channels with interference cancellation according to the present invention. The results of the two cases are depicted in FIG. 9A and FIG. 9B.

Case without Interference Cancellation

The setup of FIG. 8, when used for simulating interference between two communication channels without interference cancellation according to the present invention is as follows.

A signal for a first site A 801 and a signal for a second site B 802 are input into a pre-coder 805. The pre-coder 805 is a 16 tap pre-coder, but in the case of no interference cancellation the pre-coder 805 does not change the two input signals.

The signal for a first site A 801 and the signal for a second site B 802 are both simulated, by way of a non-limiting example, as 16 QAM signals at 50 Msps.

It is noted that embodiments of the invention may be constructed for any modulation. Non-limiting examples include QAM, FSK, OFDM, CPM, and so on. Embodiments of the invention cancel mutual interference between two or more signals interfering with each other over the air.

It is also noted that in order to cancel the mutual interference, channel impulse response is repeatedly estimated at successive points in time. Channel estimation is optionally done differently for different modulations. For example—in OFDM estimation may optionally performed directly in the frequency domain.

It is noted that embodiments of the invention have been especially described herein with reference to point-to-point communication channels at millimeter and microwave wavelengths.

The pre-coder 805 produces output of a presently unchanged signal for a first site A 806, which is split into two. One portion of the signal for the first site A 806 is fed into a notch filter 810. The notch filter 810 simulates an effect of multipath in a communication channel to site A. A delay of 6.3 nsec in the notch filter 810 was selected as a common standard for testing an ability of modems to cope with the multipath. A notch depth of 12 dB was selected to demonstrate performance improvement possible with embodiments of the present invention.

Another portion of the signal for the first site A 806 is optionally fed into a gain unit 840. The gain of the gain unit

840 is optionally set to −20 dB, producing an attenuated signal 841. The attenuated signal 841 may be added to a signal for site B to simulate interference for the communication channel to site B.

The notch filter 810 produces an output 811, which is combined with a 20 dB attenuated signal for site B 836, which is output from a gain unit 835 set to provide −20 dB gain to a signal for site B 808, at an equalizer 820. The equalizer 820 is optionally a 24 tap equalizer.

Adding the 20 dB attenuated signal for site B 808 simulates interference between the communication channel to site A and the communication channel to site B.

The pre-coder 805 produces output of a presently unchanged signal for the second site B 808, which is split into two. One portion of the signal for the second site B 808 is fed into the gain unit 835 set to provide −20 dB gain, providing the output from the gain unit 835 which was used in simulating the interference of the communication channel to site B with the communication channel to site A.

A signal quality evaluator is placed to receive output from the equalizer 820 and measure the signal quality of the simulated communication channel to site A. in the example embodiment of FIG. 8, the signal quality evaluator is a MSE evaluator 850.

Another portion of the signal for the second site B 808 is fed into a gain unit 815, which is presently set at a gain of 0 dB. The gain unit 815 produces an output signal 816, which is combined with the 20 dB attenuated signal for site A 841, in an antenna port (not shown) before entering equalizer 825. Adding the 20 dB attenuated signal for site A 841 simulates interference between the communication channel to site A and the communication channel to site B.

The above simulation flow may be depicted as occurring in a transmitter portion 860, a channel portion 865, and a receiver portion 870.

Case with Interference Cancellation

The setup of FIG. 8, when used for simulating interference between two communication channels with interference cancellation according to the present invention is similar to the setup of FIG. 8, when used for simulating interference between two communication channels without interference, with the following differences.

The signal for a first site A 801 and the signal for a second site B 802 are similar, and both input into the pre-coder 805.

The pre-coder 805 does change the signal for the first site A 801 and the signal for the second site B 802

Reference is now made to FIG. 9A, which is a constellation diagram 905 for rectangular 16 QAM produced as a result of simulating interference between two communication channels without interference cancellation according to the present invention.

The constellation diagram 905 of FIG. 9A includes an I-axis 906 and a Q-axis 907. A large number of scattered dots depict results of simulating symbols received at site A through a communication channel to site A, with interference of a communication channel to site B, through a setup as described above with reference to FIG. 8.

The received symbols of FIG. 9A are spread about their actual transmitted values due to noise in the communication channel to site A, and due to interference with the communication channel to site B.

FIG. 9A demonstrates the obtained constellation at the receiver when no pre-coding was applied. Interference limits the MSE to −20 dB. Additionally, the notch on the direct channel attenuates the signal by approximately 6.5 dB. We therefore end up with an MSE of approximately 13.5 dB.

Reference is now made to FIG. 9B, which is a constellation diagram 920 for rectangular 16 QAM produced as a result of simulating interference between two communication channels with interference cancellation according to the present invention.

The constellation diagram 920 of FIG. 9B includes an I-axis 926 and a Q-axis 927. A large number of scattered dots depict results of simulating symbols received at site A through a communication channel to site A, with interference of a communication channel to site B, through a setup as described above with reference to FIG. 8, while using interference cancellation.

The received symbols of FIG. 9B are tighter about their actual transmitted values, due to noise in the communication channel to site A, and due to much reduced effects of interference with the communication channel to site B.

FIG. 9B demonstrates the obtained constellation at the receiver when a 16-tap 2-samples-per-symbol pre-coder was applied. The MSE was improved to 36.6 dB.

It is expected that during the life of a patent maturing from this application many relevant "transmitter interference cancellation" methods will be developed and the scope of the term "transmitter interference cancellation" is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for interference reduction in transmission of at least two single carrier frequency continuous communication beams comprising:
    producing a first communication signal for a first wireless communication link;
    producing a second communication signal for a second wireless communication link;
    transmitting the first communication signal over a first continuous communication beam to a first receiver at a first frequency;
    transmitting the second communication signal over a second continuous communication beam to a second receiver at the first frequency;
    receiving the first communication signal at the second receiver;
    estimating a first channel response for the first communication signal received at the second receiver;
    sending information regarding the first channel response back to a transmitter;
and further comprising:
    a pre-coder on the transmitter side modifying the first communication signal by passing said first communication signal through a first filter, the first filter having coefficients optimized for cancellation of said first communication signal received at said second receiver, the coefficients being based, at least in part, on the information regarding the first channel response; and
    an adder adding said modified first communication signal to said second communication signal.

2. The method of claim 1 and further including:
    passing the first communication signal and the second communication signal through a channel emulator, producing output of the first communication signal mixed with an interfering pre-coded signal of the second communication signal and the second communication signal mixed with an interfering pre-coded signal of the first communication signal as modified by the channel emulator;
    measuring an error rate of at least one of the outputs of the channel emulator; and
    performing the modifying based, at least in part, on the error rate.

3. The method of claim 1 and further including:
    a first receiver receiving the first communication signal over the first continuous communication beam measuring an error rate;
    the first receiver sending the error rate to a unit configured for the modifying the first communication signal;
    performing the modifying based, at least in part, on the error rate.

4. The method of claim 1 in which the modifying is performed by phase shifting.

5. The method of claim 4 in which the phase shifting is such that the first communication signal, transmitted over the first continuous communication beam, is substantially attenuated with respect to the second communication signal, transmitted over the second continuous communication beam.

6. The method of claim 1 and further comprising:
    estimating a second channel response for the second communication signal received at the second receiver; and
    sending information regarding the second channel response back to a transmitter;
    and wherein the coefficients are also based, at least in part, on the information regarding the second channel response.

7. The method of claim 6 and further comprising:
    receiving the first communication signal at the first receiver;
    receiving the second communication signal at the first receiver;
    estimating a third channel response for the first communication signal received at the first receiver;
    estimating a fourth channel response for the second communication signal received at the first receiver;
    sending information regarding the third channel response and the fourth channel response back to the transmitter; and
    the pre-coder modifying the second communication signal using a second filter, the second filter having second coefficients optimized for cancellation of said second communication signal, the second coefficients being based, at least in part, on the information regarding the third channel response and the fourth channel response; and
    a second adder adding said modified second communication signal to said first communication signal.

8. The method of claim 7 and further comprising:
    the pre-coder modifying the second communication signal by passing said first communication signal through a third filter, producing a second instance of a modified second communication signal;
    the first adder adding said second instance of a modified second communication signal to said modified first communication signal;
    the pre-coder modifying the first communication signal by passing said first communication signal through a fourth filter, producing a second instance of a modified first communication signal; and
    the second adder adding said second instance of a modified first communication signal to said modified second communication signal.

9. The method of claim 8 in which the modifying is performed, at least in part, by passing the first communication signal and the second communication signal through four pre-coding filters, and in which coefficients for the four pre-coding filters are calculated as follows:

a sample set of N impulse response samples, $h_{11}(n)$, $h_{12}(n)$, $h_{21}(n)$, and $h_{22}(n)$ where $0 \leq n \leq N-1$, is selected;

a discrete Fourier transform of the sample set is evaluated, producing corresponding Fourier coefficients $h_{11}(k)$, $h_{12}(k)$, $h_{21}(k)$, and $h_{22}(k)$ where $0 \leq k \leq N-1$;

for each value of k a matrix $$M_k = \begin{pmatrix} H_{11}[k] & H_{12}[k] \\ H_{21}[k] & H_{22}[k] \end{pmatrix}$$

is defined;

for each matrix $M_k$ a matrix $$P_k = \begin{pmatrix} P_{11}[k] & P_{12}[k] \\ P_{21}[k] & P_{22}[k] \end{pmatrix} = M_k^{-1} \cdot \begin{pmatrix} H_{11}[k] & 0 \\ 0 & H_{22}[k] \end{pmatrix}$$

is evaluated;

for each value of k a window-coefficient W[k] is defined;

for each value of k the coefficients $P_{11}[k]$, $P_{12}[k]$, $P_{21}[k]$, and $P_{22}[k]$ are multiplied by a corresponding window coefficient W[k], producing a set of modified coefficients $\tilde{P}_{11}[k]$, $\tilde{P}_{12}[k]$, $\tilde{P}_{21}[k]$ and $\tilde{P}_{22}[k]$; and an inverse Fourier transform of the vectors $\tilde{P}_{11}[k]$, $\tilde{P}_{12}[k]$, $\tilde{P}_{21}[k]$ and $\tilde{P}_{22}[k]$ is evaluated, producing sets of time domain coefficients: $p_{11}[n]$, $p_{12}[k]$, $p_{21}[n]$, and $p_{22}[n]$, thereby producing time domain coefficients for the pre-coding filters.

10. Apparatus for interference reduction in transmission of at least two single carrier frequency continuous communication beams comprising:

a pre-coder unit configured:

to receive a first communication signal for transmission via a first wireless communication link to a first receiver;

to receive a second communication signal for transmission via a second wireless communication link to a second receiver; and to modify the first communication signal using a first filter with coefficients optimized for transmitter interference cancellation, the coefficients based, at least in part, on information received from said second receiver regarding channel response for the first communication signal received at said second receiver and also on information received from said second receiver regarding channel response for the second communication signal received at said second receiver;

to modify the second communication signal by passing the second communication signal through a second filter; and an adder configured for:

adding said second communication signal and said modified first communication signal; and adding said modified second communication signal and said modified first communication signal.

11. The apparatus of claim 10 and further comprising:

one or more channel emulators, configured to receive input of the first communication signal and the second communication signal and produce output of at least the first communication signal mixed with an interfering pre-coded signal of the second communication signal as modified by the channel emulator;

an error detector configured to input the output of the one or more channel emulators, and produce output based, at least in part, on an error rate of at least one of the inputs; and a feedback channel from the error detector to the pre-coder unit.

12. The apparatus of claim 10 and further comprising one or more phase shifters, configured to modify the first communication signal by phase shifting.

13. The apparatus of claim 10 and further comprising a third filter, a fourth filter and a second adder, and wherein:

the pre-coder is also configured to produce a second modified first communication signal by passing the first communication signal through the third filter;

the pre-coder is also configured to produce a second modified second communication signal by passing the second communication signal through the fourth filter;

the adder is configured for adding said second modified second communication signal and said modified first communication signal; and the second adder is configured for adding said second modified first communication signal and said modified second communication signal.

14. The apparatus of claim 10 in which at least some of said filters comprise an N-tap Finite Impulse Filter (FIR) for modifying the communication signal.

15. The apparatus of claim 10 in which at least some of said filters comprise an N-tap Finite Impulse Filter (FIR) for delaying the first communication signal.

16. The apparatus of claim 10 in which the pre-coder unit further comprises a delay for delaying the first communication signal.

17. A method for interference reduction in transmission of at least two single carrier frequency continuous communication beams comprising:

producing a first communication signal for a first digital communication link;

producing a second communication signal for a second digital communication link;

transmitting the first communication signal over a first continuous communication beam at a first frequency;

transmitting the second communication signal over a second continuous communication beam at the first frequency;

further comprising:

modifying the first communication signal using transmitter interference cancellation performed, at least in part, by passing the first communication signal through a pre-coding filter, and in which coefficients for the pre-coding filters are calculated as follows:

a sample set of N impulse response samples, $h_{11}(n)$, $h_{12}(n)$, $h_{21}(n)$, and $h_{22}(n)$ where $0 \leq n \leq N-1$, is selected;

a discrete Fourier transform of the sample set is evaluated, producing corresponding Fourier coefficients $h_{11}(k)$, $h_{12}(k)$, $h_{21}(k)$ and $h_{22}(k)$ where $0 \leq k \leq N-1$;

for each value of k a matrix $$M_k = \begin{pmatrix} H_{11}[k] & H_{12}[k] \\ H_{21}[k] & H_{22}[k] \end{pmatrix}$$

is defined;

for each matrix $M_k$ a matrix $$P_k = \begin{pmatrix} P_{11}[k] & P_{12}[k] \\ P_{21}[k] & P_{22}[k] \end{pmatrix} = M_k^{-1} \cdot \begin{pmatrix} H_{11}[k] & 0 \\ 0 & H_{22}[k] \end{pmatrix}$$

is evaluated;

for each value of k a window-coefficient W[k] is defined;

for each value of k the coefficients $P_{11}[k]$, $P_{12}[k]$, $P_{21}[k]$, and $P_{22}[k]$ are multiplied by a corresponding window coefficient W[k], producing a set of modified coefficients $\tilde{P}_{11}[k]$, $\tilde{P}_{12}[k]$, $\tilde{P}_{21}[k]$ and $\tilde{P}_{22}[k]$; and an inverse Fourier transform of the vectors $\tilde{P}_{11}[k]$, $\tilde{P}_{12}[k]$, $\tilde{P}_{21}[k]$ and $\tilde{P}_{22}[k]$ is evaluated, producing sets of time domain coefficients: $p_{11}[n]$, $p_{12}[n]$, $p_{21}[n]$, and $p_{22}[n]$, thereby producing time domain coefficients for the precoding filters.

* * * * *